United States Patent
Hill et al.

(10) Patent No.: US 10,449,673 B2
(45) Date of Patent: *Oct. 22, 2019

(54) ENHANCED CONFIGURATION AND CONTROL OF ROBOTS

(71) Applicant: Microsoft Technology Licensing, LLC, Redmond, WA (US)

(72) Inventors: David M. Hill, Bellevue, WA (US); Jeffrey J. Evertt, Kirkland, WA (US); Alan M. Jones, Duvall, WA (US); Richard C. Roesler, Sammamish, WA (US); Andrew William Jean, Seattle, WA (US); Emiko V. Charbonneau, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 180 days.

This patent is subject to a terminal disclaimer.

(21) Appl. No.: 15/642,236

(22) Filed: Jul. 5, 2017

(65) Prior Publication Data
US 2017/0297204 A1    Oct. 19, 2017

Related U.S. Application Data

(63) Continuation of application No. 14/824,019, filed on Aug. 11, 2015, now Pat. No. 9,713,871.
(Continued)

(51) Int. Cl.
*B25J 9/16* (2006.01)
*B25J 13/00* (2006.01)
(Continued)

(52) U.S. Cl.
CPC ............. *B25J 9/1666* (2013.01); *B25J 9/163* (2013.01); *B25J 9/1664* (2013.01); *B25J 9/1676* (2013.01);
(Continued)

(58) Field of Classification Search
CPC ........ B25J 13/00; B25J 13/088; B25J 13/089; B25J 9/162; B25J 9/1664; B25J 9/1666;
(Continued)

(56) References Cited

U.S. PATENT DOCUMENTS

| 4,482,960 A | 11/1984 | Pryor |
| 6,016,385 A | 1/2000 | Yee et al. |

(Continued)

FOREIGN PATENT DOCUMENTS

| CN | 101794349 A | 8/2010 |
| CN | 202693992 U | 1/2013 |

(Continued)

OTHER PUBLICATIONS

Chong et al., "Robot programming using augmented reality: An interactive method for planning collision-free paths", 2009, Robotics and Computer-Integrated Manufacturing 25, pp. 689-701 (Year: 2009).*

(Continued)

*Primary Examiner* — Spencer D Patton
(74) *Attorney, Agent, or Firm* — Newport IP, LLC; Jacob P. Rohwer

(57) ABSTRACT

Concepts and technologies are described herein for providing enhanced configuration and control of robots. Configurations disclosed herein augment a mobile computing device, such as a robot, with resources for understanding and navigation of an environment surrounding the computing device. The resources can include sensors of a separate computing device, which may be in the form of a head-mounted display. Data produced by the resources can be used to generate instructions for the mobile computing device. The sensors of the separate computing device can also detect a change in an environment or a conflict in the actions of the mobile computing device, and dynamically (Continued)

modify the generated instructions. By the use of the techniques disclosed herein, a simple, low-cost robot can understand and navigate through a complex environment and appropriately interact with obstacles and other objects.

16 Claims, 15 Drawing Sheets

Related U.S. Application Data

(60) Provisional application No. 62/153,460, filed on Apr. 27, 2015.

(51) Int. Cl.
  *G02B 27/01* (2006.01)
  *G06T 19/00* (2011.01)
  *G06F 3/01* (2006.01)
  *G06T 7/73* (2017.01)

(52) U.S. Cl.
  CPC ............ *B25J 9/1694* (2013.01); *B25J 13/006* (2013.01); *G02B 27/0172* (2013.01); *G06F 3/011* (2013.01); *G06T 7/73* (2017.01); *G06T 19/006* (2013.01); *G02B 2027/014* (2013.01); *G02B 2027/0138* (2013.01); *Y10S 901/02* (2013.01); *Y10S 901/06* (2013.01)

(58) Field of Classification Search
  CPC ..... B25J 9/1676; B25J 9/1697; Y10S 901/01; G06T 19/006; G06T 7/70–77; G02B 27/017; G02B 27/0172
  See application file for complete search history.

(56) References Cited

U.S. PATENT DOCUMENTS

| | | | |
|---|---|---|---|
| 6,741,911 B2 | 5/2004 | Simmons | |
| 7,054,045 B2 | 5/2006 | McPheters et al. | |
| 7,714,895 B2 | 5/2010 | Pretlove et al. | |
| 7,787,992 B2 | 8/2010 | Pretlove et al. | |
| 7,881,901 B2 | 2/2011 | Fein et al. | |
| 8,077,963 B2 | 12/2011 | Wang et al. | |
| 8,212,768 B2 | 7/2012 | Fein et al. | |
| 8,482,606 B2 | 7/2013 | Razzaque et al. | |
| 8,718,822 B1 | 5/2014 | Hickman et al. | |
| 8,847,919 B2 | 9/2014 | Krah | |
| 8,902,225 B2 | 12/2014 | Fein et al. | |
| 9,495,783 B1 | 11/2016 | Samarasekera et al. | |
| 9,911,043 B2 | 3/2018 | Saitwal et al. | |
| 10,007,413 B2 | 6/2018 | Hill et al. | |
| 2001/0037163 A1 | 11/2001 | Allard | |
| 2002/0044152 A1 | 4/2002 | Abbott, III et al. | |
| 2005/0251290 A1 | 11/2005 | Skourup et al. | |
| 2006/0241792 A1 | 10/2006 | Pretlove et al. | |
| 2009/0300535 A1 | 12/2009 | Skourup et al. | |
| 2009/0322671 A1 | 12/2009 | Scott et al. | |
| 2010/0145514 A1 | 6/2010 | Kim et al. | |
| 2011/0191707 A1 | 8/2011 | Lee et al. | |
| 2012/0127284 A1 | 5/2012 | Bar-zeev et al. | |
| 2012/0249588 A1 | 10/2012 | Tison et al. | |
| 2012/0293548 A1 | 11/2012 | Perez et al. | |
| 2013/0038633 A1 | 2/2013 | Maggiore | |
| 2013/0050069 A1 | 2/2013 | Ota | |
| 2013/0050432 A1 | 2/2013 | Perez et al. | |
| 2013/0073092 A1 | 3/2013 | Hosek | |
| 2013/0144482 A1 | 6/2013 | Tuukkanen | |
| 2013/0147686 A1 | 6/2013 | Clavin et al. | |
| 2013/0162632 A1 | 6/2013 | Varga et al. | |
| 2013/0231779 A1 | 9/2013 | Purkayastha et al. | |
| 2013/0246967 A1 | 9/2013 | Wheeler et al. | |
| 2013/0321390 A1 | 12/2013 | Latta et al. | |
| 2013/0328925 A1 | 12/2013 | Latta et al. | |
| 2013/0335405 A1 | 12/2013 | Scavezze et al. | |
| 2014/0049559 A1 | 2/2014 | Fleck et al. | |
| 2014/0055352 A1 | 2/2014 | Davis et al. | |
| 2014/0058407 A1 | 2/2014 | Tsekos et al. | |
| 2014/0146038 A1 | 5/2014 | Kangas et al. | |
| 2014/0146133 A1 | 5/2014 | Nikonov et al. | |
| 2014/0176530 A1 | 6/2014 | Pathre | |
| 2014/0184645 A1 | 7/2014 | Ur | |
| 2014/0192084 A1 | 7/2014 | Latta et al. | |
| 2014/0198017 A1 | 7/2014 | Lamb et al. | |
| 2014/0253432 A1 | 9/2014 | Ferguson | |
| 2014/0257525 A1 | 9/2014 | Nagamatsu et al. | |
| 2014/0267399 A1 | 9/2014 | Zamer | |
| 2014/0282008 A1 | 9/2014 | Verard et al. | |
| 2014/0320389 A1 | 10/2014 | Scavezze et al. | |
| 2014/0325206 A1 | 10/2014 | Kim et al. | |
| 2014/0333666 A1 | 11/2014 | Poulos et al. | |
| 2014/0372037 A1 | 12/2014 | Kim | |
| 2015/0061998 A1 | 3/2015 | Yang et al. | |
| 2015/0109332 A1 | 4/2015 | Manzoni et al. | |
| 2015/0116354 A1 | 4/2015 | Tomlin et al. | |
| 2015/0269760 A1 | 9/2015 | Murakami et al. | |
| 2015/0274074 A1 | 10/2015 | Petrillo et al. | |
| 2016/0311116 A1 | 10/2016 | Hill et al. | |
| 2016/0314621 A1 | 10/2016 | Hill et al. | |

FOREIGN PATENT DOCUMENTS

| | | |
|---|---|---|
| WO | 2005066744 A1 | 7/2005 |
| WO | WO2005088539 A2 | 9/2005 |
| WO | 2009121380 A1 | 10/2009 |

OTHER PUBLICATIONS

"Final Office Action Issued in U.S. Appl. No. 14/824,031", dated Dec. 6, 2017, 18 Pages.
"Final Office Action Issued in U.S. Appl. No. 14/824,031", dated Apr. 6, 2017, 15 Pages.
"Non Final Office Action Issued in U.S. Appl. No. 14/824,031", dated Aug. 15, 2017, 15 Pages.
"Final Office Action Issued in U.S. Appl. No. 14/824,042", dated Nov. 24, 2017, 31 Pages.
"Final Office Action Issued in U.S. Appl. No. 14/824,042", dated Mar. 9, 2017, 22 Pages.
"Non Final Office Action Issued in U.S. Appl. No. 14/824,042", dated Jul. 26, 2017, 24 Pages.
"Final Office Action Issued in U.S. Appl. No. 14/946,688", dated May 16, 2017, 33 Pages.
"Non-Final Office Action Issued in U.S. Appl. No. 14/946,688", dated Oct. 20, 2017, 35 Pages.
"Non-Final Office Action Issued in U.S. Appl. No. 14/946,688", dated Mar. 2, 2017, 32 Pages.
Furstenau, et al., "Steps Towards the Virtual Tower: Remote Airport Traffic Control Center (RAiCe)", In Journal of Reconstruction, vol. 1, Issue 2, 11 Pages.
Stamp, Jimmy, "Saab Reinverts Air Traffic Control with a Digital Panorama", Retrieved From: https://www.smithsonianmag.com/arts-culture/saab-reinvents-air-traffic-control-with-a-digital-panorama-112525034/, Jun. 4, 2012, 4 Pages.
Stephen, R. Ellis, "Towards Determining of Visual Requirements for Augmented Reality Displays and Virtual Environments for the Airport Tower", in Book of NATO R & T Organisation, Jun. 1, 2006, 9 Pages.
"Smartphones poised to include 5,000 ppi hologram projectors", Retrieved from <<http://www.msn.com/en-ie/news/other/smartphones-poised-to-include-5000ppi-hologram-projectors/ar-AA1gwVc>>, Mar. 6, 2014, 3 Pages.
"The Holographic Home", Retrieved from <<https://www.youtube.com/watch?v=89KxxpmMhi4&feature=youtu.be>>, Retrieved on: Jul. 10, 2015, 2 Pages.
"Non-Final Office Action Issued in U.S. Appl. No. 14/824,019", dated Nov. 17, 2016, 14 Pages.
"Notice of Allowance Issued in U.S. Appl. No. 14/824,019", dated Mar. 21, 2017, 5 Pages.

(56) References Cited

OTHER PUBLICATIONS

"Non-Final Office Action Issued in U.S. Appl. No. 14/824,031", dated Dec. 7, 2016, 14 Pages.
"Non-Final Office Action Issued in U.S. Appl. No. 14/824,042", dated Oct. 14, 2016, 46 Pages.
Purcher, Jack, "Samsung Invents a Futuristic Holographic-like User Interface", Retrieved from <<http://www.patentlymobile.com/2014/06/samsung-invents-a-futuristic-holographic-like-user-interface.html>>, Jun. 10, 2014, 5 Pages.
Boyle, Britta O'., et al., "Smart lighting solutions: Here are seven options to choose from", Retrieved from <<https://web.archive.org/web/20170719180449/http://www.pocket-lint.com/news/130002-smart-lighting-solutions-here-are-seven-options-to-choose-from>>, May 7, 2015, 11 Pages.
Edwards-Onoro, Deborah, "The Internet of Things: Our Homes in 2025 [Infographic]", Retrieved from <<http://www.lireo.com/internet-of-things-our-homes-in-2025-infographic/>>, Sep. 16, 2014, 7 Pages.
Gallagher, Sean, "The holographic robot uprising: Microsoft shows off its IoT ambitions", Retrieved from <<https://arstechnica.com/information-technology/2015/04/the-holographic-robot-uprising-microsoft-shows-off-its-iot-ambitions/>>, Apr. 30, 2015, 3 Pages.
"International Search Report and Written Opinion Issued in PCT Application No. PCT/US2015/026087", dated Jul. 1, 2016, 12 Pages.
"International Preliminary Report on Patentability Issued in PCT Application No. PCT/US2016/026087", dated Dec. 5, 2016, 8 Pages.
"Second Written Opinion Issued in PCT Application No. PCT/US2016/026087", dated Sep. 16, 2016, 7 Pages.
"Second Written Opinion Issued in PCT Application No. PCT/US2016/027644", dated Sep. 30, 2016, 7 Pages.
"International Preliminary Report on Patentability Issued in PCT Application No. PCT/US2016/027644", dated Jan. 5, 2017, 8 Pages.
"International Search Report and Written Opinion Issued in PCT Application No. PCT/US2016/027644", dated Jul. 26, 2016, 12 Pages.
Purcher, Jack, "Microsoft wants to bring an Exiting Holographic Interface to Future Versions of their Surface Devices", Retrieved from <<http://www.patentlymobile.com/2015/05/microsoft-wants-to-bring-an-exiting-holographic-interface-to-future-versions-of-their-surface-devices.html>>, May 25, 2015, 9 Pages.
"International Search Report and Written Opinion Issued in PCT Application No. PCT/US2016/029100", dated Jul. 4, 2016, 12 pages.
"International Preliminary Report on Patentability Issued in PCT Application No. PCT/US2016/029100", dated Aug. 3, 2017, 8 Pages.
Ackerman, "MIT's Augmented Reality Room Shows What Robots Are Thinking," Published on: Nov. 5, 2014 Available at: http://spectrum.ieee.org/automaton/robotics/artificial-intelligence/mit-augmented-reality-room-shows-what-robots-are-thinking 2 pages.
Bajwa, et al., "An Autonomous Robot Framework for Path Finding and Obstacle Evasion", In International Journal of Computer Science and Telecommunications, vol. 1, Issue 1, Nov. 2011, 6 pages.
CNET News, "Using HoloLens, Microsoft Overlays Physical Robot with Holographic Robot", Published on: Apr. 29, 2015, Available at: https://www.youtube.com/watch?v=xnrHFV34PfM.
Fiala, "A robot control and augmented reality interface for multiple robots," In Proceedings of Canadian Conference on Computer and Robot Vision, May 25, 2009, 6 pages.
Holz, et al., "Where Robots and Virtual Agenda Meet," in International Journal of Social Robotics, vol. 1, Issue 1, Jan. 2009, 13 pages.
Murru, et al., "Augmented Reality Framework for the 3D Interactive Mobile Representation of the Ancient Forum of Nerva", In Thesis Master of Science, Apr. 28, 2015, 84 pages.
Rose, et al., "Annotating Real-World Objects Using Augmented Reality", In Technical Report ECRC-94-41, Jun. 1995, 21 pages.
Sonnino, et al., "Fusion4D: 4D Unencumbered Direct Manipulation and Visualization", In Proceedings of XV Symposium on Virtual and Augmented Reality, May 28, 2013, pp. 134-141.
Tu, Frank., "Revolution of Smartphone Display: Holographic Interaction to replace Naked Eye 3D", Published on: Jul. 15, 2014, Available at: http://www.gizmochina.com /2014/07/15/revolution-of-smartphone-display-holographic-interaction-to-replace-naked-eye-3d/, 7 pages.
Wang, Xiangyu, "Improving Human-Machine Interfaces for Construction Equipment Operations with Mixed and Augmented Reality", In Publication InTech Open Access, Oct. 1, 2008, 16 pages.
Yasumuro, et al., "Consistent Presentation of Interactive Virtual Objects in Real Space with 3D Markers—Interactive Virtual Interior Design", In Proceedings of VIIth Digital Image Computing: Techniques and Applications, Dec. 10, 2003, pp. 653-662.
"Non Final Office Action issued in U.S. Appl. No. 15/995,129", dated Jul. 12, 2019, 17 Pages.

* cited by examiner

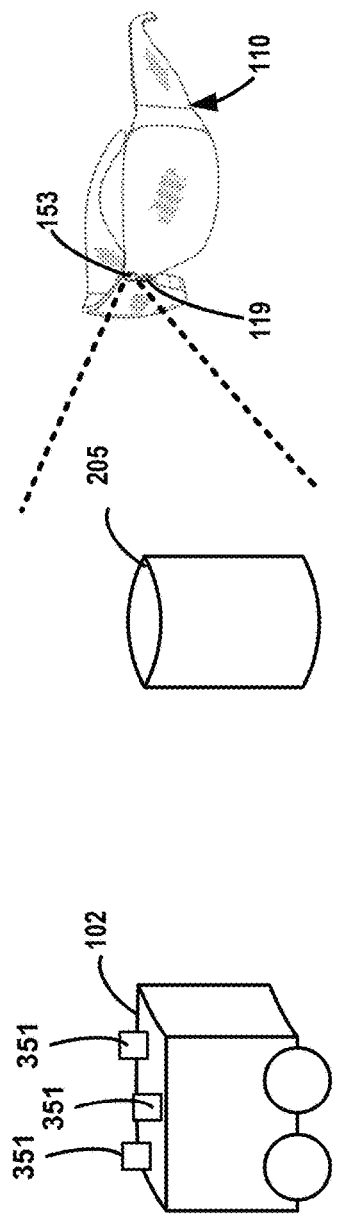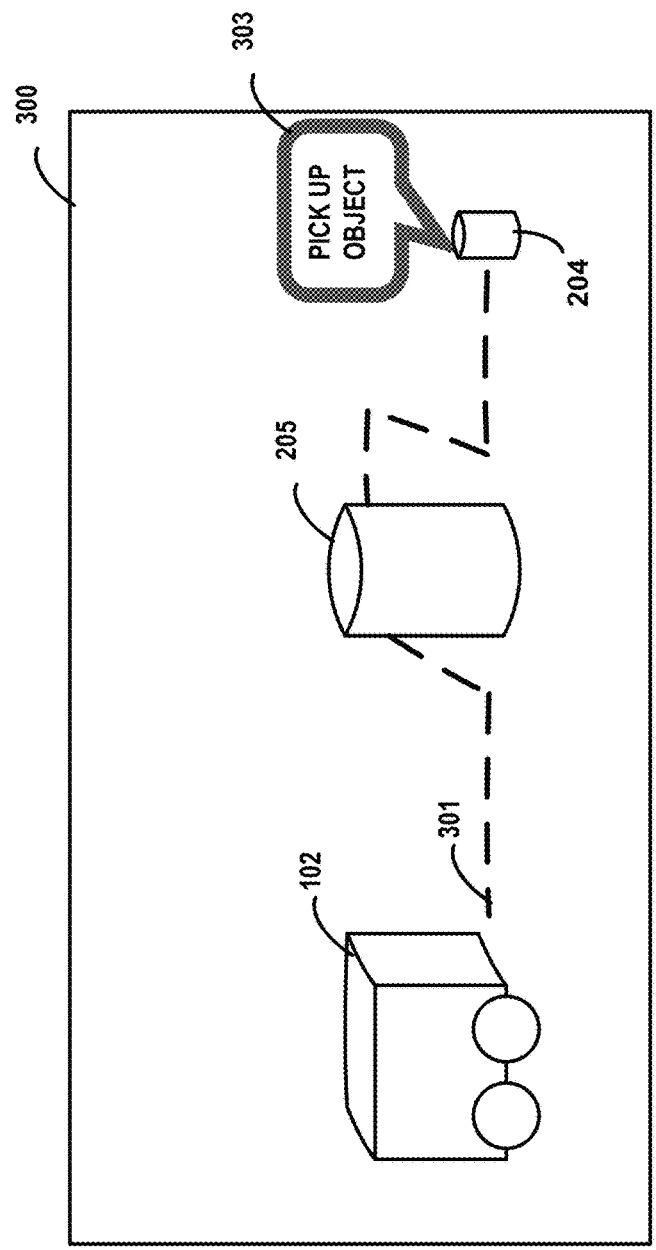
FIG. 3A
FIG. 3B

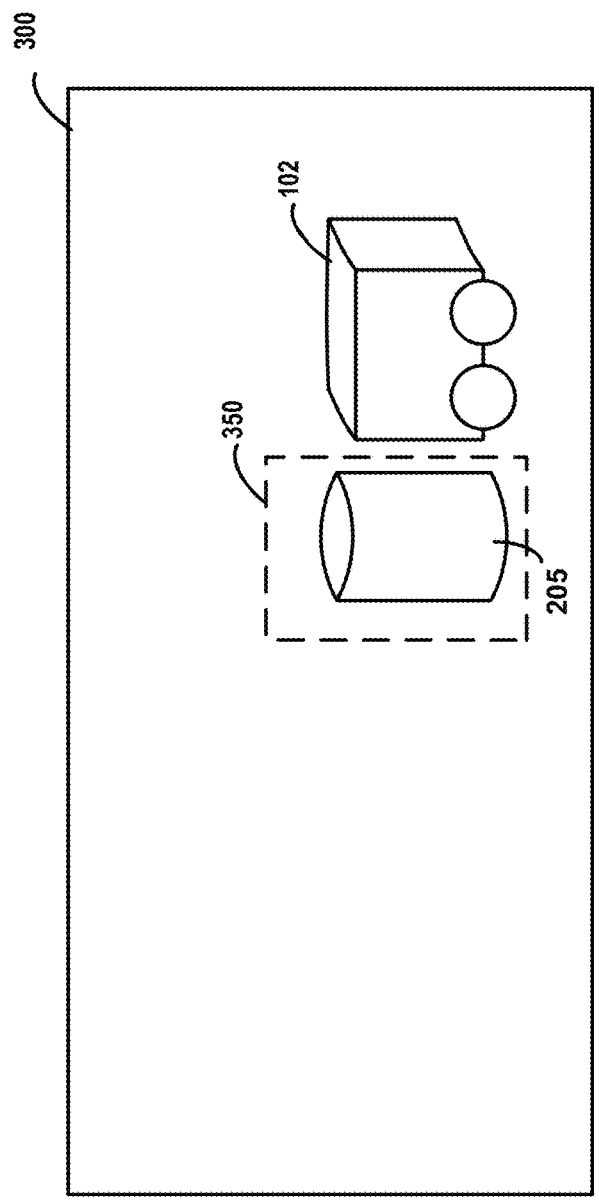

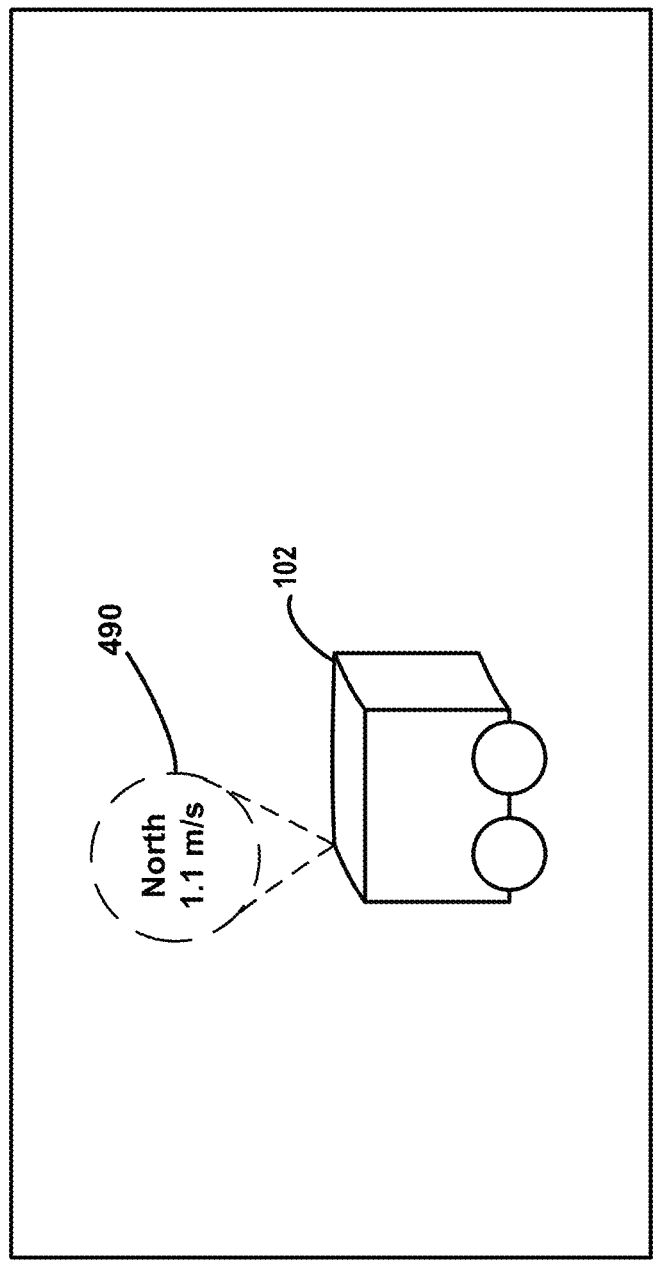

ENHANCED CONFIGURATION AND CONTROL OF ROBOTS

REFERENCE TO PRIORITY APPLICATIONS

This application is a continuation application that claims priority to co-pending U.S. Non-Provisional application Ser. No. 14/824,019 filed Aug. 11, 2015 entitled "Enhanced Configuration and Control of Robots," which claims priority to U.S. Provisional Application No. 62/153,460 filed Apr. 27, 2015 entitled "Enhanced Configuration and Control of Robots," both of which are expressly incorporated herein.

BACKGROUND

Mobile robots need to be able to operate within an environment to avoid obstacles, perform tasks, identify paths from one location to another, etc. Existing technologies require complex and expensive hardware as well as complex and computationally expensive software to perform most tasks and navigate effectively through an environment. Among many other practical drawbacks, existing systems place most robotic functions out of reach of low to mid-range robots.

In addition, when working with robots, it may be difficult to determine what a robot is planning and what it may or may not understand about its surroundings. To address this issue, some traditional systems display a limited amount of information about a robot's surroundings. When received by a user, this information may be difficult to interpret, and it may be difficult to take action on the received information.

Among other drawbacks of some existing technologies, when working with robots or other electronic or mechanical devices, it can be difficult or costly to add display panels and input mechanisms for processing, monitoring and communicating certain types of information. For instance, it may be difficult in some systems to track a status, setting or configuration modification to a robot's software.

Some solutions to this drawback include the utilization of display panels and input keypads. However, such solutions add complexity and cost to any robot or computing device. In other solutions, a robot may operate a web server and enable a view of data via the web browser on a remote computer. Such solutions, while cheaper than physical displays and input panels, do not provide a granular level of context with any communicated information. Many developments in this area have been made but most existing systems are not cost effective, particularly when it comes to low to mid-range devices.

It is with respect to these and other considerations that the disclosure made herein is presented.

SUMMARY

Concepts and technologies are described herein for providing enhanced configuration and control of robots. Generally described, configurations disclosed herein can augment the functionality of a computing device, such as a robot, with resources for understanding an environment and objects around the computing device. The resources can include sensors of a separate computing device, such as a head-mounted display (HMD). The resources can be configured to identify the location and other parameters of the environment and objects in the environment. Data generated by the resources can be used to generate instructions for the mobile computing device. The generated instructions can be based, at least in part, on data defining the location and/or other parameters of the environment and objects in the environment.

By the use of the techniques disclosed herein, a simple, low-cost robot can understand and navigate through a complex environment and appropriately interact with obstacles and other objects. In addition, by the use of the sensors of a separate computing device, the techniques herein can provide dynamic navigational and functional corrections for a robot that is performing one or more tasks, such as following a path. Techniques disclosed herein improve the accuracy of a robot's movement, and in some scenarios, the techniques disclosed herein provide corrective instructions if a mobile computing device starts to diverge from a specified path or incorrectly interacts with one or more objects. In addition, the techniques disclosed herein can analyze a set of instructions determine the validity of the instructions with respect to an environment or changes in an environment. For example, if an object moves within an environment, techniques disclosed herein can modify the instructions to alter the robots actions to avoid a collision or interact appropriately with the moved object.

In some configurations, techniques disclosed herein involve a first computing device having one or more sensors configured to detect a location and geometric parameters of a second computing device and an environment around the second computing device. In some configurations, for example, the first computing device can be a personal computer or an HMD, and the second computing device may be a mobile robot. The first computing device can have a memory having a first set of computer-executable instructions stored thereupon that can cause the first computing device to receive data or signals from the sensors.

Based on the data or signals, the first computing device can generate data identifying the geometric parameters of the environment. In addition, the first computing device can generate location data identifying the location of the second computing device relative to objects in the environment based on the signal. In addition, the first computing device can generate a second set of instructions for the second computing device to perform one or more tasks based, at least in part, on the location data identifying the location of the second computing device and/or the data identifying the geometric parameters of the environment.

The first computing device can also communicate the second set of instructions to the second computing device and cause the second computing device to perform one or more tasks based on the second set of instructions. By the use of the techniques described herein, the second set of instructions may be utilized by the second computing device to navigate through the environment based on geometric parameters of the environment and objects that are detected by the first computing device. For example, the second set of instructions can define a path for the second computing device to navigate within the environment, wherein the second set of instructions define a path for the second computing device to avoid collisions with objects in the environment. In addition, the second set of instructions may be utilized by the second computing device to interact with objects within the environment. For example, as described in more detail herein, the second computing device may pick up objects, avoid boundaries of an environment and perform, a number of tasks based on the instructions generated by the first computing device.

In some configurations, sensors of the first computing device can detect the presence of a conflict and/or determine if a circumstance has changed with the environment. Modifications to the second set of instructions may be generated and communicated to the second computing device based on the detection of a conflict or a change within the environment. For example, the sensors of the first computing device can determine if an object has moved with the environment. In such circumstances, the first computing device may modify the second set of instructions to address the moved object. In addition, sensors of the first computing device may detect a conflict between an object in the environment and the second computing device. For example, if the second computing device runs into a boundary of the environment, e.g., a robot collides with a wall, modifications to the second set of instructions may be generated and communicated to the second computing to mitigate the conflict.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-3E illustrate example renderings of model data showing a robot performing a number of tasks based on a set of instructions;

FIG. 4B illustrates example rendering of a graphical element of attached data indicating movement of a computing device;

DETAILED DESCRIPTION

Figure 1:
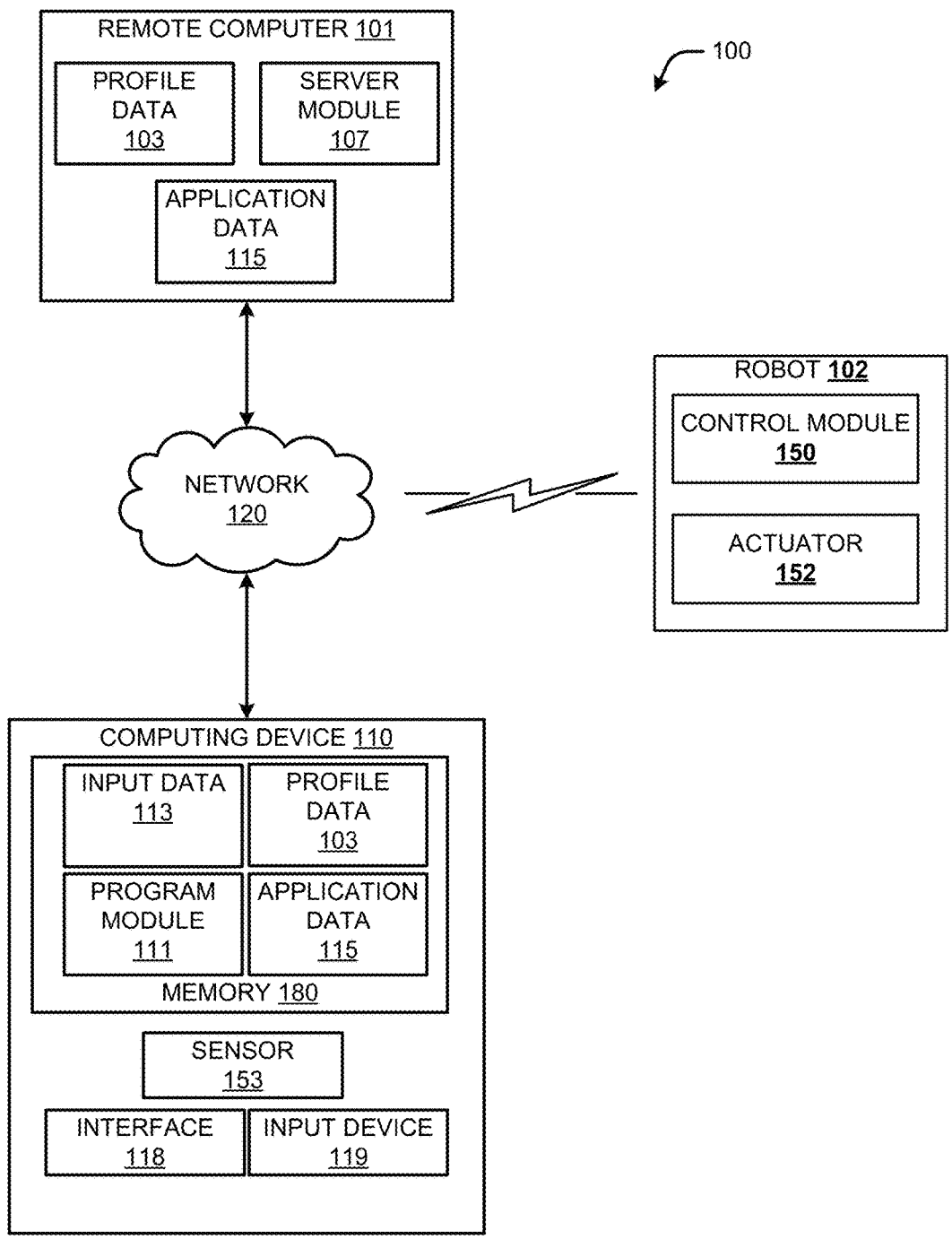
FIG. 1 is a block diagram showing several example components for providing enhanced control of one or more robots, a mixed environment display of robotic actions, and a mixed environment display of attached data.

Technologies described herein provide enhanced control of one or more robots, a mixed environment display of robotic actions, and a mixed environment display of attached data. Using a computing device, such as a head-mounted display (an "HMD"), equipped with a number of capabilities, such as Surface Reconstruction capabilities coupled with techniques of localizing a robot in an environment, the techniques provided herein cause a robot to have environment understanding, obstacle avoidance and pathfinding. Based on the information received by the computing device, instructions, such as pathfinding instructions, may be generated. The instructions may be communicated to the robot for execution.

In some configurations, as the robot follows the instructions, the computing device can continue to track the robot's location and the accuracy with which the robot is following the specified path. If the robot starts to diverge from the path, the computing device can detect such actions and send corrective instructions to get the robot back on track. Similarly, if the environment changes, e.g., a new obstruction appears, invalidating the path sent to the robot, those instructions can be corrected to allow the robot to react to the environment dynamically.

Technologies described herein provide techniques for visualizing a robot's actions in the space where they will occur before they are performed for improved understanding and safety. In addition, techniques and technologies provide visualizations from the perspective of a robot (of the space around the robot), e.g., the location and identification of people or objects, for improved understanding and safety. Techniques and technologies also provide visualizations of past actions of a robot in the space where they occurred to confirm correct operation and/or debug incorrect operation.

Technologies described herein provide techniques for attaching holographic UIs and other graphical elements to display information associated with a robot and environmental elements, such as objects around the robot. The generation of a holographic or other graphical element associates the information attached to the robot or other objects. The techniques also provide the ability for a user to edit instructions, information and other data displayed to the user. Techniques disclosed herein attach the holograph or other graphical elements representing information to the robot or other objects or electronic devices where it is most relevant. By providing graphical representation association information with one or more components or objects, a user may readily understand a status, scenario or a broader context associated with the robot and its surroundings.

Technologies described herein provide techniques for capturing and interpreting user actions such as a gesture, voice command or any other type of input. User actions can be interpreted to generate data describing the actions, such as a gaze direction, and the data describing the actions may be interpreted to generate instructions for causing a robot to perform the actions of the user. The instructions are based on a number of other factors, such as objects or environmental elements surrounding the robot. By localizing the robot with a computing device configured to collect and process contextual data, a user can easily and naturally specify locations in space that can be translated into locations that the robot understands.

As summarized above, when working with robots, it may be difficult to determine what a robot is planning and what it may or may not understand about its surroundings. Technologies and techniques provided herein generate a mixed reality display configured to enable a user to naturally visualize a robot's planned actions in the space where they will occur as well as its perception of the world around it, enabling safer and more natural interaction with the robot.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings. Furthermore, the claimed subject matter is not limited to implementations that solve any or all disadvantages noted in any part of this disclosure.

While the subject matter described herein is primarily presented in the general context of techniques for providing enhanced control of one or more robots, it can be appreciated that the techniques described herein may apply to any type of sensor and/or any type of device embodying the sensors. As will be described in more detail herein, it can be appreciated that implementations of the techniques and technologies described herein may include the use of solid state circuits, digital logic circuits, computer component, and/or software executing on one or more devices. Signals described herein may include analog and/or digital signals for communicating a changed state, movement and/or any data associated with motion detection.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for providing enhanced control of one or more robots. As will be described in more detail below with respect to FIGS. 8-10, there are a number of applications and services that can embody the functionality and techniques described herein.

FIG. 1 is a system diagram showing aspects of one illustrative mechanism disclosed herein for providing enhanced configuration and control of robots. As shown in FIG. 1, a system 100 may include a remote computer 101, a computing device 110, a robotic device 102, and a network 120. For illustrative purposes, the robotic device 102 is also referred to herein as a "robot 102" or a "second computing device 102."

The computing device 110 may operate as a stand-alone device, or the computing device 110 may operate in conjunction with other computers, such as the remote computer 101. As can be appreciated, the remote computer 101, the robot 102 and the computing device 110 are interconnected through one or more local and/or wide area networks, such as the network 120. In addition, the robot 102 may be in communication with the computing device 110 and other computers by the use of one or more components. For instance, the robot 102 may be equipped with one or more light sources, and the computing device 110 may include one or more sensors, including a camera, for detecting the location of the robot 102. As will be described in more detail below, the robot 102 may be configured with light sources, sensors and transmitting devices to facilitate communication with one or more devices. Other wired or wireless communication mechanisms may be utilized to provide communication between one or more components and/or devices shown in FIG. 1 and other components or computers. In some configurations, the robot 102 can also include an input device, a sensor, such as a camera, or other devices for generating image data or input data 113. Any data obtained or generated by the robot 102 can be communicated to another computer or device, such as the computing device 110 or remote computer 101. It should be appreciated that many more network connections may be utilized than illustrated in FIG. 1.

The computing device 110 may be in the form of a personal computer, a wearable computer, including an HMD, or any other computing device having components for causing a display of one or more images on a display, such as an interface 118. In some configurations, the interface 118 may be configured to cover at least one eye of a user. In one illustrative example, the interface 118 may include a screen configured to cover both eyes of a user. The system 100 or aspects of the system 100 may generate one or more images for generating a stereoscopic view of one or more objects. The computing device 110 may comprise a sensor 153, such as a sonar sensor, a depth sensor, infrared sensor, heat sensor, touch sensor, or any other device or component for detecting the presence, position, and/or characteristics of an object. In addition, the computing device 110 can comprise an input device 119, such as a keyboard, mouse, microphone, or any other device configured to generate a signal and/or data based on any interaction with the computing device 110. For illustrative purposes, signals or data provided by a component, such as the sensor 153 or the input device 119 is referred to herein as input data 113. Input data 113 may also include contextual data or other data received from a computing system, such as the remote computer 101, or a server providing a resource or service, such as the services and resources (914-924) shown in FIG. 9.

The interface 118 may be configured to display multiple images from different environments. For example, some configurations of the interface 118 can allow a user to see through selectable sections of the interface 118 enabling the user to view his or her surroundings. For illustrative purposes, the user's perspective looking through the interface 118 is referred to herein as a "real-world view" or a "view" of an object or surrounding environment. As will be described in more detail below, content can be displayed around selected portions of the interface 118 enabling a user to see displayed content along with views of real-world objects observed through the selected portions of the interface 118.

The configurations described herein provide both a "see through display" and an "augmented reality display." For illustrative purposes, the "see through display" may include a transparent lens that can have content displayed on it, and the augmented reality display may include an opaque display that is configured to overlay content over a display of an image, which may be from any source, such as a video feed from a camera used to display a real-world view. For illustrative purposes, some examples disclosed herein describe an overlay of content over a display of an image. In addition, some examples disclosed herein describe techniques that overlay content over a "see through display" enabling a user to see a real-world view with the content. It can be appreciated that all techniques described herein may apply to a "see through display," an "augmented reality display," or variations thereof.

The computing device 110 may include a local memory 180 that stores profile data 103, input data 113, and application data 115. The profile data 103 may store information describing user activity, preferences and other information used for providing control of one or more computing devices, such as a robot. The application data 115 may include output data generated by techniques disclosed herein. As will be described in more detail below, the application data 115 may include status data, image data, data identifying the geometric parameters, and other data utilized by the techniques disclosed herein.

The computing device 110 may also include a program module 111 configured to manage techniques described herein and interactions between a user and the computing device 110. For example, as will be described in more detail below, the program module 111 may be configured with one or more surface reconstruction algorithms and other algorithms for locating objects and devices. The surface reconstruction algorithms and other algorithms may use data or signals collected from one or more sensors 153, such as a depth sensor attached to the computing device 110. The program module 111 may be in the form of a game application, a virtual reality application, an operating system component or any other application configured to display image data, such as video data and/or image data, on a display. In some illustrative examples, the program module 111 is a robotic controller application or game application that creates or allows a user to interact with a virtual world environment or an augmented reality environment. In another illustrative example, the program module 111 may be in the form of an operating system component or a productivity application.

The remote computer 101 may be in the form of a server computer or a number of server computers configured to store and process the profile data 103, application data 115 and other information associated with the user or other applications. As can be appreciated, the remote computer 101 may store duplicate copies of the profile data 103 and the application data 115 allowing a centralized service to coordinate a number of client computers, such as the computing device 110. The remote computer 101 may also include components, such as the server module 107, for executing one or more techniques described herein. As will be described in more detail herein, the server module 107 may operate in conjunction with other modules, such as the program module 111, to implement aspects of the techniques disclosed herein. In some configurations, techniques disclosed herein may be performed by the computing device 110.

The robot 102 may be equipped with a control module 150 for executing instructions communicated to the robot 102. The robot 102 may have one or more control components, such as an actuator 152. Components of the robot 102, such as the actuator 152, may be configured to generate a physical movement of one or more objects from instructions received by the robot 102. As will be described in more detail below, the robot 102 may also comprise a number of motors configured to control the movement of the robot 102.

In some aspects of the disclosure, the computing device 110 detects one or more conditions based on the input data 113 and other data and generates one or more instructions for controlling the robot 102. In some configurations, the computing device 110 obtains input data 113 and other data describing the location and status of the robot 102. In addition, the computing device 110 may obtain and process data indicating a location of the robot 102 relative to the computing device 110.

Any input data 113 received from any resource, such as a remote computer or a sensor, may be used by the computing device 110 to determine the location of any object, the location of the computing device 110 and the location of the robot 102. For instance, the computing device 110 or the robot 102 may include one or more sensors for obtaining depth map data, such as a depth sensor, and other data to identify the location of various objects in a room, including the room boundaries. Configurations disclosed herein can generate data describing geometric parameters of any object or boundary.

Any known technology for identifying the location of one or more objects may be used by the techniques disclosed herein. In one example, data defining the location of the robot 102 may be obtained by the computing device 110 by the use of an optical sensor, such as a camera or any other sensor 153 or input device 119, and lights or other visual elements mounted on the robot 102. In this illustrative example, multiple LEDs may be mounted on the top of the robot 102. Some LEDs may have different colors to identify a direction of the robot 102. The LEDs can be mounted on the robot 102 at a predetermined distance and predetermined position relative to one another. Knowing the distance and position of the LEDs, in addition to other information such as the color arrangement of the LEDs, a direction and position of the robot 102 may be determined. Any known technology, such as a technology utilizing triangulation techniques, may be used to identify a position and direction of the robot 102. In addition, other technologies can be used to determine a distance between the robot 102 and the computing device 110.

These examples are provided for illustrative purposes only and are not to be construed as limiting. Any technology may be used for identifying a location of any computing device or object, which may involve the use of a radio signal, a light-based signal or any signal capable of identifying the location of an object. The computing device 110 may process any input data 113 from any device or resource to identify the location and other contextual information regarding objects or computing devices.

In some configurations, the robot 102 may have one or more sensors for capturing and generating data. In one illustrative example, the robot 102 may be equipped with one or more depth map cameras. The depth map cameras, or any other type of sensor, may collect data describing objects detected by the sensors. In yet another example, the robot 102 may be equipped with a wheel position sensor. Data or a signal generated by such sensors, such as the wheel position sensor, may be used to identify the location, velocity or other information regarding the robot 102. These examples are provided for illustrative purposes only and are not to be construed as limiting. It can be appreciated that a number of sensors or devices may be used to generate/obtain data associated with one or more objects and to identify the location of one or more objects.

The obtained data, such as depth map data, may be then processed by the techniques described herein to identify objects and the location of objects, and to generate and display data associated with the object. In the examples described herein, the data associated with the object is displayed on a user interface with a representation or graphical element that shows an association between the data associated with the object and an object. For illustrative purposes, data that is associated with an object is referred to herein as "attached data" or data that is "attached" to an object. In addition, any obtained data, also referred to herein as input data 113, may be used for generating and modifying instructions for one or more computing devices, e.g., a robot 102.

In some configurations, the computing device 110 can be configured to perform or manage complex navigation and pathfinding tasks for the robot 102. Such configurations may enable the robot 102 to have a simplistic structure and possibly simplistic software algorithms, which ultimately allows for a lower cost device. Such a configuration is also scalable in that a single computing device, such as a head-mounted display, can be used to navigate and control many robots 102 without the need for each robot 102 to be equipped with expensive hardware or software components.

In some configurations, the computing device 110 interprets input data 113 and/or other data to determine a context with respect to the objects in the room. The computing device 110 may perform one or more functions, such as a depth map analysis and surface reconstruction analysis to identify objects and properties of objects. For instance, certain geometric shapes and other parameters, such as a size of an object, may be used to categorize or characterize individual objects, e.g., an object may be characterized as "furniture," a "high-priority object," or a "primary object." Other data related to objects in an environment may be obtained from databases or other resources, such as the services and resources depicted in FIG. 9.

In some configurations, the techniques disclosed herein may process input data 113 from one or more resources to generate contextual data. The contextual data can be used by techniques described herein to identify a location associated with each identified object. Based on location information, other data, and other properties associated with each object, the techniques disclosed herein can generate instructions for a robot to perform one or more tasks. The generated instructions may be based on the location of the identified objects, such as a computer, geometric data, characteristics of an object, and other contextual information.

To illustrate aspects of the techniques disclosed herein, consider a scenario where the robot 102 is in an environment, e.g., a room, with other objects. A user wearing a head-mounted display may be standing in the room with the other objects and the robot 102. Sensors 153 and input devices 119 mounted to the head-mounted display can generate signals or data associated with the robot 102 and the other objects. For instance, the signals or data can be processed by one or more methods, such as technologies involving triangulation algorithms, to identify the location of the objects and/or the robot 102. Other input data 113 may be received and processed with the signals or data to identify the location of the objects and/or the robot 102 and other parameters, such as the size and shape of the objects and/or the robot 102. Processing can be applied to any received data or signal to identify the location and geometric properties of objects in the room. The obtained information can be used to generate one or more instructions that may be communicated to the robot 102 for execution. The instructions enable the robot 102 to perform one or more tasks, which may involve interaction between the robot 102 and one or more objects in the room.

Figure 2A:
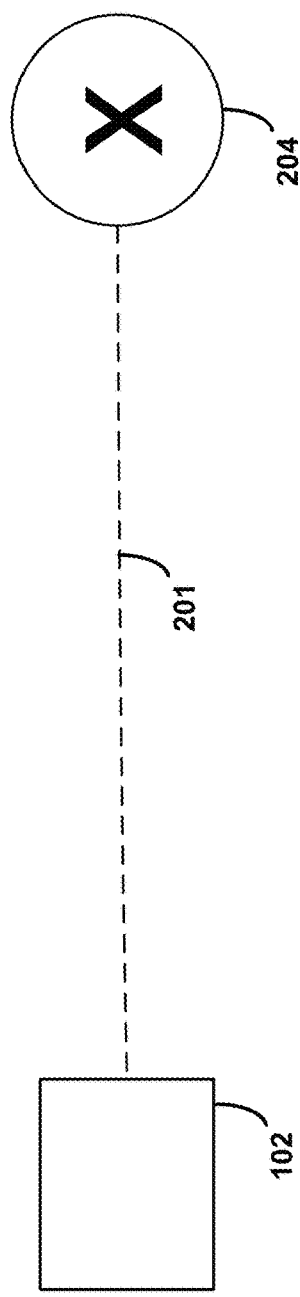
FIGS. 2A-2B illustrate example scenario of a robot performing a number of tasks based on a set of instructions.

With reference to FIG. 2A, a robot 102 may be configured to perform a task associated with an object 204. For example, the computing device 110 may interpret various types of data, such as image data, to determine the location of the robot 102 and the location of the object 204. Based on the location of each object, the techniques disclosed herein can generate instructions for the robot 102 to interact with the object 204. In one illustrative example, instructions configured for the robot 102 may cause the robot 102 to follow a path 201 (illustrated with a dashed line in FIG. 2A) the robot 102 may use to navigate to the object 204. In addition, the instructions may cause the robot 102 to pick up the object 204, or perform any other task, which may involve any interaction with the object 204. Instructions configured for the robot 102 may cause the robot 102 to move along a path 201 and perform any number of tasks defined in the instructions, which may include one or more tasks associated with the object 204.

During execution of the instructions, the robot 102 and other devices can also provide feedback information to the computing device 110. The feedback information may be processed by the computing device 110 to make adjustments or modifications to the generated instruction set. As described above, instructions may be generated, derived or obtained based on any type of input data. This feedback mechanism allows the computing device 110 to make adjustments to the instructions communicated to the robot 102 as the robot 102 is performing tasks.

Figure 2B:
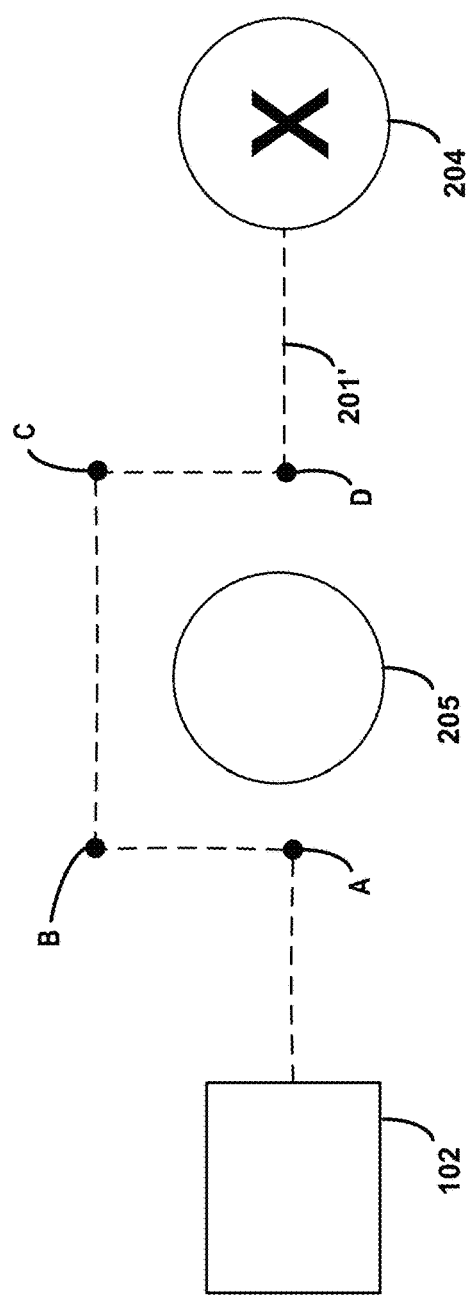

FIG. 2B illustrates a scenario where an obstacle 205 is positioned between the robot 102 and the first object 204. Such a scenario may arise if the obstacle 205 has been moved into the position shown in FIG. 2B. As summarized above, techniques described herein enable the computing device 110 to adapt to changed circumstances, such as the introduction of the obstacle 205.

By the use of one or more sensors of the computing device 110, and possibly sensors attached to the robot 102, the computing device 110 may identify the location of the robot 102 relative to the obstacle 205 and the object 204. Based on a number of parameters, which may include the size and location of the obstacle 205, the computing device 110 may generate a set of instructions for the robot 102 to go around the obstacle 205 and perform one or more tasks associated with the first object 204. In some configurations, the generated instructions may define a modified path 201' (illustrated with a dashed line in FIG. 2B) for the robot 102 to follow. In addition, the instructions may be rule-based. For example, the generated instructions may simply identify objects to avoid. In addition, the instructions may provide specific tasks such as pick up an object, provide information, collect information, etc. For illustrative purposes, instructions generated in response to a changed circumstance or a condition, such as an error or conflict, are referred to as "modified instructions" or "modifications to the instructions." Adjustments to one or more instructions may be made at any point during the execution of the instructions. For instance, with reference to FIG. 2B, input data 113 may be processed by the computing device 110 at point "A," point "B" or at any other point, to generate new instructions or modify stored instructions.

In other aspects of the present disclosure, the techniques disclosed herein provide a graphical representation of the instructions and other status data. As summarized herein, it may be difficult for a user to determine what a robot is planning and what the robot may or may not be considering about its surroundings. For instance, when a robot 102 is configured with instructions, the user is generally required to execute the instructions with the robot 102 to determine if the instructions are valid. To address such shortcomings with respect to some existing systems, instructions configured for a robot 102 are analyzed and displayed as a graphical representation.

In some configurations, the instructions are analyzed using a simulator modeled from data describing characteristics of a mobile computing device, such as the robot 102. For example, if the robot 102 has a maximum speed of 2 miles per hour and can only lift 10 lbs., techniques disclosed herein may execute instructions using a simulator utilizing such parameters. In addition, a simulator can also utilize data describing objects or boundaries of an environment. One or more projected results from the simulation may be generated as output data, also referred to herein as "model data." The techniques disclosed herein may then generate data defining an animation or rendering of the robot 102 based on the model data. Output data defining a rendering may include an animation or other graphical elements representing the model data. For illustrative purposes, FIGS. 3A-3E illustrate examples of a display that can be based on the model data and/or other data.

Consider the example scenario shown in FIG. 3A. The computing device 110, which is in the form of an HMD, can provide instructions to a robot 102. In this example, the HMD includes an input device 119, which can include a microphone, sonar sensor or any other device for receiving an input caused by an object or user. In addition, the HMD includes a sensor 153, which can include a camera directed, as illustrated by the dashed lines, toward the robot 102, an obstacle 205 or any other object in an environment. As summarized above, the robot 102 may be configured with one or more visual identifiers 351, such as colored lights, for use in detecting the location and direction of the robot 102. Although this example illustrates a configuration with lights, any type of visual identifier or physical characteristic may be used.

Based on a user's inspection of the instructions, it may be difficult for the user to identify the exact path the robot 102 may travel. In addition, it may be difficult for the user to predict the type of interactions that may occur based on the instructions. To address such issues, a graphical display 300, such as the one shown in FIG. 3B, may be displayed to the user wearing the HMD configured with the techniques described herein. The graphical display 300 can include, for example, a representation of the robot 102 and representations of one or more objects, such as the obstacle 205. The instructions may be represented by a number of graphical elements or animations. In the example shown in FIG. 3B, based on an interpretation or a simulation of the instructions, a path 301 to be performed by the robot 102 may be determined and displayed. One example of the path 301 is shown with dashed line shown in FIG. 3B. As shown, the graphical display 300 can include multiple stages, where each stage can represent a task associated with the instructions. Other representations using symbols, text descriptions, graphical elements, or animations can be displayed to show different movements, functions or tasks. In one illustrative example, a graphical display 300 may animate the robot 102 picking up an object, entering data, receiving data or any other function that may be performed by a robot. As shown, a graphical element 303 can involve text with a one or more graphical elements, such as the quote box shown in FIG. 3B, illustrating an association between the text and the object 204.

By showing a graphical representation of a path and other tasks that may be performed by the robot 102, a user may easily understand how the robot will interact with different objects and obstacles. By the use of such technologies, instructions may be modified and tested by a user or a computer without requiring the robot 102 to actually perform the actions. Such configurations may be beneficial where fuel and other energy resources may be needed for a robot to operate.

These examples provided herein are for illustrative purposes only and are not to be construed as limiting. For example, some configurations disclosed herein may generate data that shows tasks and functions a robot has performed in the past. Thus, a history of instructions actually executed by the robot 102 may be rendered in an animation or other type of display allowing a user to view a rendering of the robot 102 with a rendering or image of the robot's environment. For example, the illustration of FIG. 3B can be used to illustrate a robot's past performance.

In some configurations, the graphical representation of the instructions are displayed as "mixed reality" or "augmented reality" renderings overlaid on top of the real-world view entirely. The computing device may display the robot's instructions as well as generate instructions and overlay the instructions on a view of the real-world where they will take place in an environment. Renderings of the instructions or rendering describing the instructions are arranged so that they are readily and naturally understandable to a user.

Figure 3C:
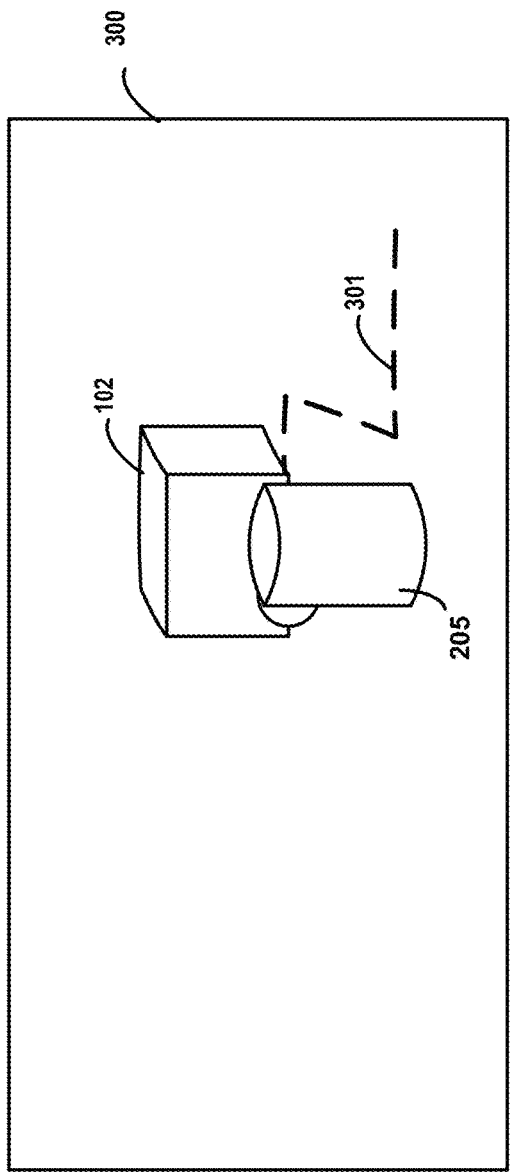
Figure 3D:
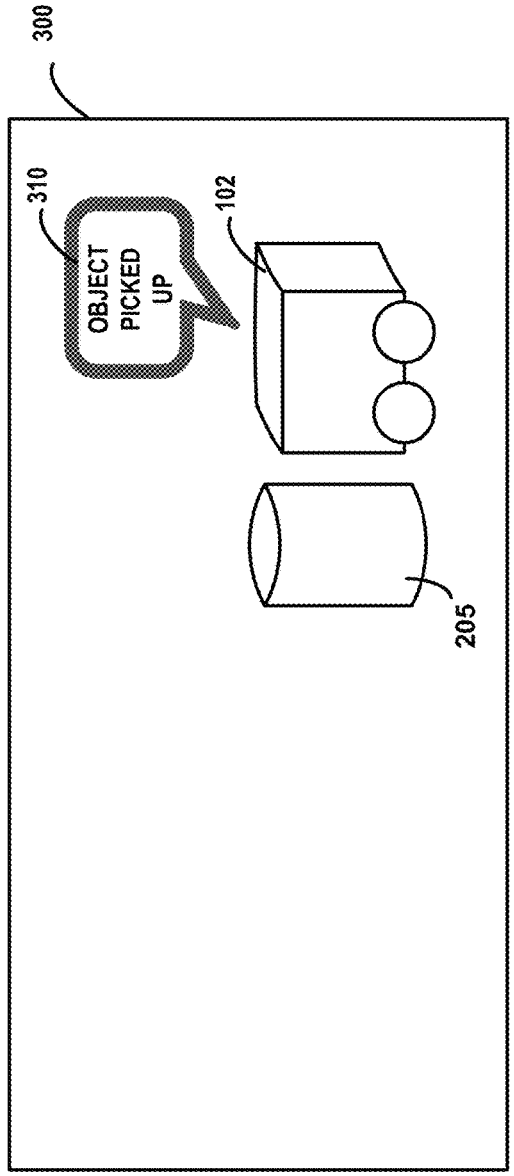

As shown in FIG. 3C and FIG. 3D, the computing device 110 can generate different displays illustrating an execution or a simulation of a set of instructions. As shown in FIG. 3C, a position of the robot 102 relative to an environment and an object, such as the obstacle 205, can be displayed to a user. In addition, a graphical element can show a remaining path 301 of the robot 102. The graphical element representing the path 301 can show navigational projections and intent of the robot 102. In addition, parts of the path 301 may be removed from the display to indicate a stage or progress of the execution or simulation of the instructions.

As shown in FIG. 3D, various status indicators attached to various stages of execution can be displayed. For instance, a graphical element 310 may provide status information associated with a function, task or instruction. In the present example, the graphical element 310 indicate that a task has been performed, e.g., that the object has been picked up. In some configurations, the graphical element 310 includes text describing a function, task or instruction. The display of any status information or any representation of a function task or instruction may be based on a number of factors. For example, status information may be displayed when an error, conflict, or level of success is detected.

In some configurations, techniques disclosed herein may select sections of an interface 118, where the selected sections are configured to be transparent. Such sections provide a user with a real-world view of one or more objects, such as the elements of an environment and the robot 102. The environment may include objects and/or other aspects of the environment, such as walls or boundaries. For illustrative purposes, a mixed environment display can include a display of graphical representations with real-world views of one or more real-world objects. For example, a rendering of a graphical element representing a path of a robot can be displayed in conjunction with a real-world view of the environment and/or objects in the environment.

FIG. 3E illustrates one example of a mixed environment display. In this example, an interface of a computing device is configured to provide one or more transparent sections allowing users of the computing device 110 to see a real-world view of objects in a surrounding environment. Configurations disclosed herein may create a selectable section 350 within the interface to provide a real-world view of an object, such as the obstacle 205, through the interface. Thus, renderings of various objects, such as a rendering of the robot 102, may be displayed with a real-world view of real-world objects, such as the obstacle 205. This example is provided for illustrative purposes only and is not construed to be limiting. It can be appreciated that a number of transparent sections may be generated within an interface. In addition, it can be appreciated that a number of rendered objects may be displayed with any number of real-world views of real-world objects.

In other aspects, configurations disclosed herein determine if the instructions create a conflict with one or more objects. If it is determined that the instructions create a conflict with at least one object, the techniques disclosed herein modify the instructions to remove or mitigate the conflict. For example, a conflict may involve an instruction that causes the robot to collide with one or more objects in a room. The removal of the conflict may involve the generation of an instruction that guides the robot to avoid the collision.

The new instructions may be interpreted by the system to generate a graphical representation that illustrates the execution of the new instructions. In some configurations, graphical representations of the new instructions may be displayed to the user in a manner shown in FIGS. 3B-3D. In some configurations, a graphical representation illustrates several versions of different instructions so the user may view, compare, select and edit more than one set of instructions. The edits may be performed by the use of voice commands, gestures or other actions performed by the user.

In other aspects of the present disclosure, by the use of the graphical representations, the computing device 110 may also illustrate a history of commands or instructions that were executed by the robot 102. This display of instructions may be in the form of a text description, a graphical representation or even an animation or video rendering of the robot 102. By generating and displaying a graphical representation illustrating a history of commands, a user may observe how a robot got to a particular state. As summarized above, such graphical representations may be used for debugging and analysis purposes.

As summarized above, data describing a status or other information may be attached to one or more components of a robot or other objects. Based on one or more factors, the data may be displayed with a component or object. A graphical element or the arrangement of the data with respect to a component or object may be displayed allowing the user to readily identify how the data is associated with one or more components or objects.

Figure 4A:
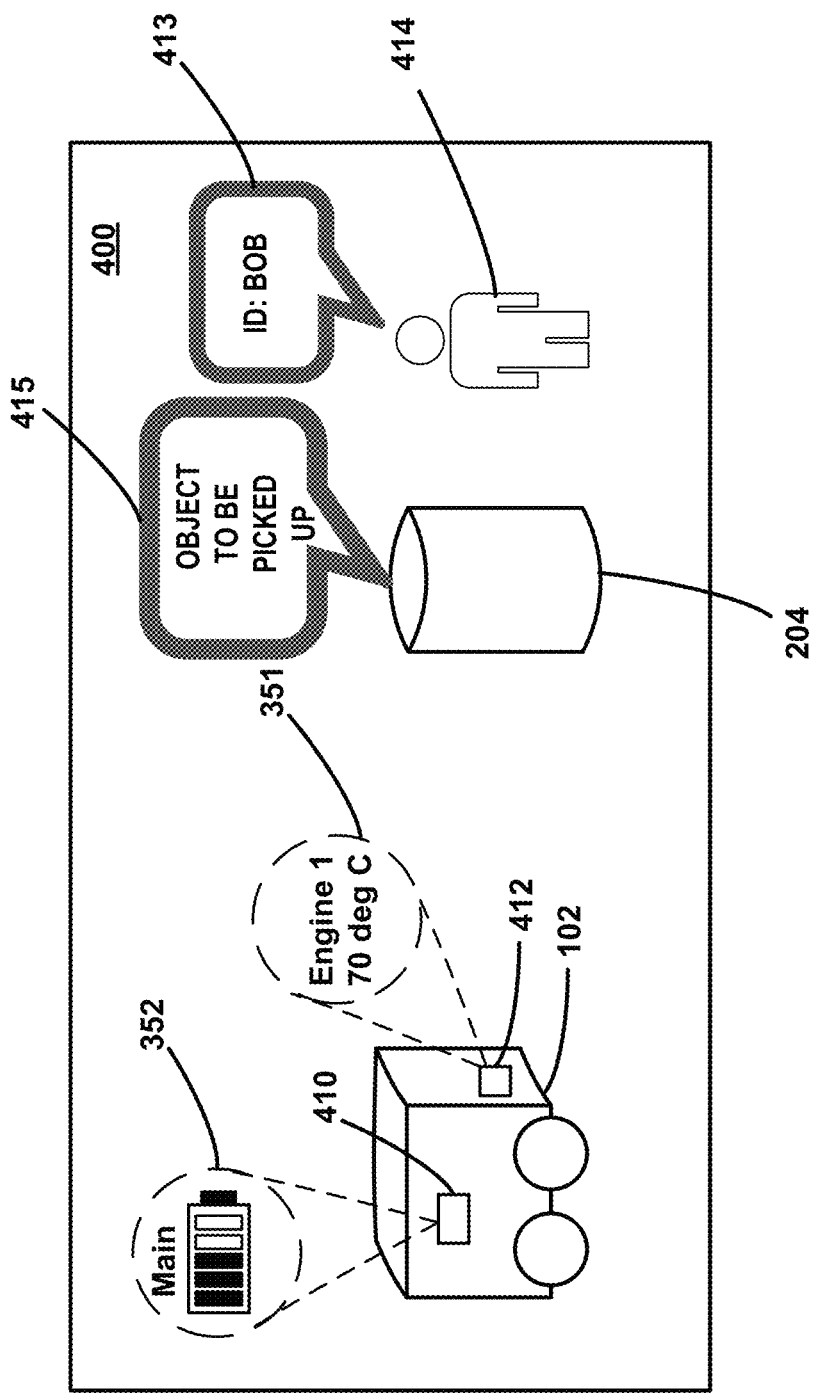
FIG. 4A illustrates example rendering of one or more displays of data attached to one or more objects.

FIG. 4A illustrates one example where data is displayed with one or more attached objects, such as a component of the robot 102. In this example, a battery status 352 is displayed. As shown, dashed lines or other graphical elements may be displayed to show an association between the status data and the attached object. In this example, the graphical representations illustrate that the battery status 352 is directly related to a battery 410 and that an engine status 351 is directly related to an engine 412.

FIG. 4B illustrates an example rendering of a display of attached data indicating movement of a computing device, e.g., the robot 102. In this example, the velocity of a robot 102 is displayed by the use of an attached visual indicator 490. In some configurations, dashed lines or other graphical elements may be displayed to show an association between the status data and the attached object. In this example, the visual indicator 490 is configured to show an association between the status data and the robot 102. As shown in this example, a direction and velocity are described in the visual indicator 490. In some configurations, the size, position, and other characteristics of the visual indicator 490 may be based on one or more factors. For example, the size, position, and other characteristics of the visual indicator 490 may be based on the size of a view of the robot 102. This example is provided for illustrative purposes and is not to be construed as limiting.

Figure 4C:
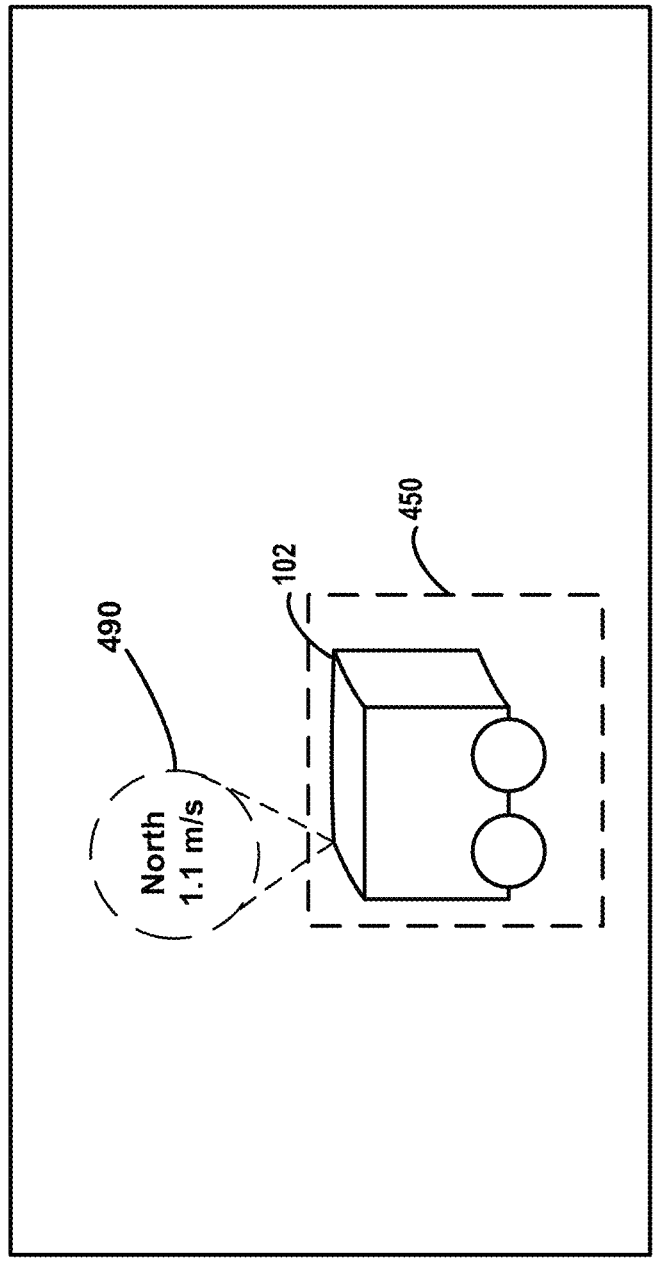
FIG. 4C illustrates example rendering of a graphical element of data attached to a real-world view of a computing device.

FIG. 4C illustrates an example rendering of attached data with a real-world view of a computing device. In this example, an interface of a computing device is configured to provide one or more transparent sections allowing users of the computing device to see a real-world view of real-world objects and a surrounding environment. As shown in FIG. 4C, configurations disclosed herein may create a selectable section 450 within the interface to provide a real-world view of an object, such as the robot 102, through the interface. Thus, renderings of various types of data, such as the attached visual indicator 490, may be displayed with a view of real-world objects, such as the robot 102. This example is provided for illustrative purposes only and is not construed to be limiting. It can be appreciated that any number of transparent sections may be generated within an interface. In addition, it can be appreciated that any number of rendered graphical elements may be displayed with any number of real-world views of various objects.

Some configurations disclosed herein can display a graphical augmentation of an object on an interface. The graphical augmentation can be positioned in relation to the position of the real-world view of a real-world object, such as the robot 102 or any other object. The position of the graphical augmentation can move with the movement of the real-world view of the object to provide the appearance that the graphical augmentation is affixed or substantially affixed to the real-world object. A graphical element showing a display of attached data can also be configured and arranged to show an association between the attached data and the graphical augmentation.

Figure 4D:
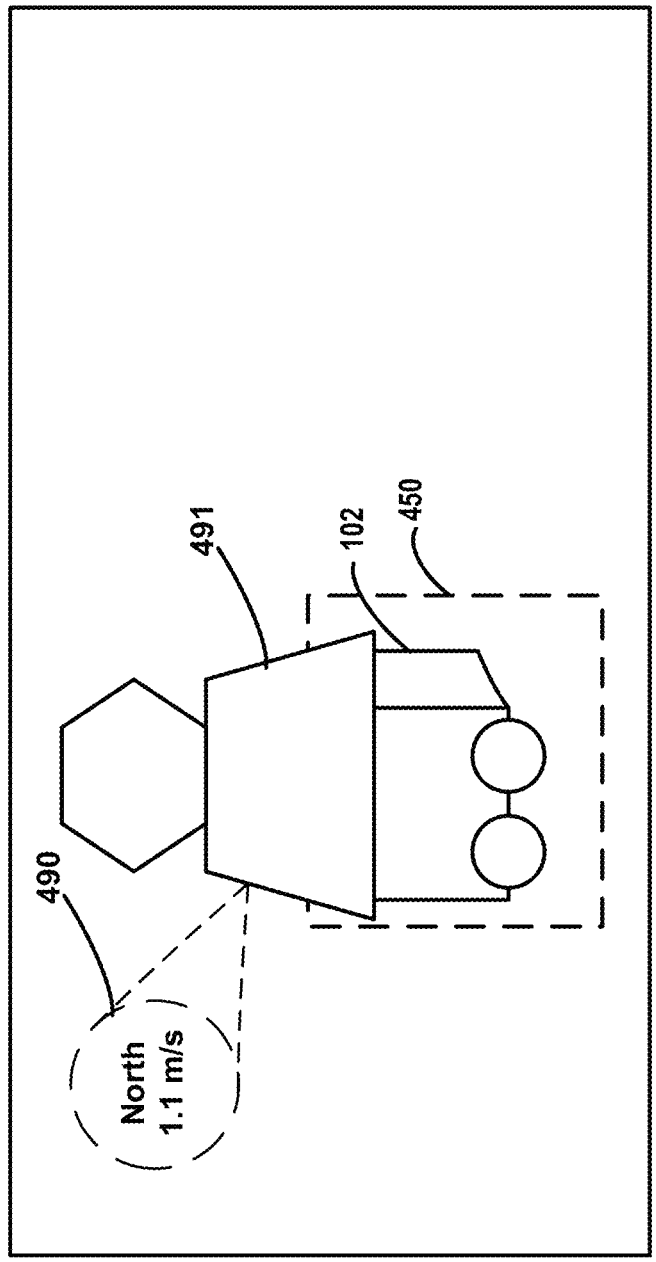
FIG. 4D illustrates example rendering of data attached to a real-world view of a computing device with the display of a mixed environment augmentation of the computing device.

FIG. 4D illustrates an example rendering of data attached to a real-world view of a computing device with the display of a mixed environment augmentation of the computing device. In this example, similar to the example of FIG. 4C, an interface of a computing device is configured to provide one or more transparent sections allowing users of the computing device to see a real-world view of one or more objects and/or a surrounding environment. As shown in FIG. 4D, configurations disclosed herein may create a selectable section 450 within the interface to provide a real-world view of a real-world object, such as the robot 102, through the interface. In addition, FIG. 4D also includes the display of a graphical representation 491 of an augmentation configured to supplement the real-world view of the robot 102. The attached data, which in this example comprises a visual indicator 490, can be graphically associated with the real-world view of the robot 102 or the attached data can be graphically associated with other components, such as the graphical representation 491 of the augmentation.

By showing an association between data and an attached object, a user can readily discern a status or other information associated with one or more devices, components, or other objects. Such configurations may be beneficial when a robot has a large number of components. For instance, if a robot has a number of batteries or a number of motors, when an error or problem is detected with respect to a particular battery or motor, techniques described herein may identify the specific battery or motor that has the problem and directly associate attached data allowing the user to readily pinpoint any issues. As can be appreciated, any component, such as the battery or engine, can be represented by any graphical element or animation. It can be also appreciated that any graphical element, animation, or even an arrangement or position of data may be used to illustrate an association between data and any attached object.

The display of attached data may be triggered by one or more factors. For example, attached data may be displayed to a user if there is a problem with a particular component. One or more thresholds may be used to determine if data should be displayed to a user. In some examples, a temperature reading or a power level may be compared to a threshold and relevant data can be displayed if one or more conditions are met. In another example, a usage level of a particular component can be measured. In such an example, a computer may store data indicating the expected lifespan of one or more components. As the component is used, one or more measurements, e.g., a usage time measured in hours or days, may be monitored and compared to a threshold. Once one or more measurements approach or reach a threshold, the techniques disclosed herein may take one or more actions to indicate the same. These examples are provided for illustrative purposes and are not to be construed as limiting. Any type of status or measurement of any combination of components may be used to determine if attached data is to be displayed.

A status of a computing device or a status of a component of the computing device may be determined using one or more mechanisms. For example, a robot 102 may communicate the status of a component, such as the temperature of a motor or the power level of a battery, to a remote computer, such as the computing device 110. In some configurations, the status of a computing device or the status of a component of a computing device may be determined by the use of a sensor. For example, a camera of an HMD may detect a status by capturing image data of a component. Other sensors, such as an infrared sensor, may measure a temperature of a device. Any measurement based on an analysis of image data can be used to determine a status. For example, images may show stress fractures or parts that are out of place. In such scenarios, image data showing the depth of a groove, a distance measured between components, or other conditions can be used to determine a status, such as the presence of an error or conflict.

In some configurations, contextual data describing one or more scenarios may be used to determine when attached data is to be displayed to a user. In addition, contextual data describing the scenarios may be used to determine the type of data that may be displayed. For example, a robot may be configured to install seats in a vehicle. When presented with such a scenario, the computing device may display data that is attached to the seats or certain components of the vehicle near the seats. In yet another scenario, if the robot is configured to paint the vehicle, the computing device may display data that is relevant to the exterior service of the vehicle, or the computing device may display data attached to the paint. By providing contextually aware, relevant information, user interaction with the robot and its surroundings may be improved. The displayed data may appear and disappear automatically depending on any factor, such as a status of a device, a scenario associated with the robot, etc. In addition, the display of attached data may be based on a mode or a user setting of the computing device.

In an example display 400 shown in FIG. 4A, data that is attached to an object is displayed in a manner that shows an association between the data and the object. In addition, if the computing device detects the presence of a person, the person may be identified by the use of facial recognition technologies or other technologies, and based on the identification, other information may be retrieved from one or more resources (such as the resources depicted in FIG. 9) and displayed on an interface. As shown in this example, such information may be attached to a rendering of the person 414 by the use of a graphical element 413. In this example, the person's name is displayed with a dialog box showing the attachment between the information and a representation of the person. Any type of information may be attached to an object, a real-world view of the person, or a rendering of the person 414. For instance, the attached information may describe a status of a device, person or object, or the attached information may describe other contextual information related to the device or person.

In another example shown in FIG. 4A, a graphical element 414 can show status data associated with an object 204. In such an example, a graphical element 415 of the status data can describe an interaction with the object 204. The interaction can be a past action, a current, a future action. The graphical element 414 may also provide a description of other information related to the object 204, information that may be obtained from one or more resources, such as the resources depicted in FIG. 9.

In yet another aspect of the techniques disclosed herein, a user may train or configure a robot. In some configurations, techniques herein may generate instructions or other types of commands, based on gestures, actions or other forms of input. The computing device 110 may be configured with a number of sensors for detecting movements and other actions of a user. The movements and actions of the user, such as entering data on a keyboard, picking up an object, walking in a path, looking in a particular direction, or other types of activity may be detected and translated into instructions for a robot. In some configurations, the instructions are conformed to guide a robot to perform the actions carried out by the user. Movements, tasks and even an expression or a mood may be defined in the instructions. Instructions may allow a robot to perform, express or emulate the actions, expressions or mood captured from the user.

In some configurations, video data and other data captured by sensors or other types of input may be processed to derive contextual information. The contextual information may capture and prioritize movements and actions of a user. The contextual information may be used to determine goals or tasks, such as to pick up an object or to move to a workstation and interact with a computer. The contextual information may also be used to generate a number of instructions which may cause a robot to follow a particular path, direct cameras and move in a particular direction, e.g., following the gaze direction of a user, and other actions.

In one illustrative example, a user wearing a HMD may walk through a park and by the use of hand gestures, the user can identify trash on the ground. By use of the technologies described herein, the user can point to a particular object on the ground, and with an interpretation of the gesture and/or other types of input, such as a voice command, the computing device may select one or more objects and generate instructions that may cause a robot to pick up the selected objects.

Any type of input data may be used for these techniques, which may involve the use of location information from a GPS device, a map of an environment received from a remote computer and other contextual data such as the size and shape of an object. The generated instructions may be communicated to a robot, allowing the robot to perform the tasks interpreted by actions of the user wearing the HMD. In the present example, the robot may be configured to follow the user, as the user selects objects, and pick up the selected objects. In some configurations, the instructions may cause the robot to function autonomously without direction from a user.

These examples are provided for illustrative purposes and not to be construed as limiting as any user action detected by a computing device may be interpreted to generate instructions for a computer or robot. FIG. 2B may be used to illustrate one example. A user wearing a computing device such as an HMD, may follow a particular path, e.g., from point "A" to point "B." The user may perform different functions at each point, such as reading information from a computer screen, entering data in a keyboard, communicating commands by one or more of gestures or voice commands, etc. Instructions may be generated based on the user's actions, which may include movement patterns, a gaze direction and interactions with other objects or computers. In some configurations, the computing device may capture the user's actions by the use of a number of sensors, including a camera, microphone and other sensors. The actions may be interpreted by the computing device to generate instructions for a computer or robot to carry out tasks or actions performed by the user.

The computing device may also be configured with one or more technologies for detecting a mood of a user or other contextual information. For instance, the computing device may listen to inflections in a user's voice and other observations associated with a user's expressions. The interpreted information may be used to determine a user's mood. The captured expressions, such as the user's mood, may be used to generate one or more instructions for a robot to perform, which may emulate the mood.

For example, in a situation where a robot is to greet people at a door, a user may wear a computing device, e.g., an HMD, to capture statements of the user, interpret a mood of the user, and also capture other interactions with other people or objects. The interactions and actions performed by the user captured by the computing device may be interpreted and translated into instructions for the robot. The instructions are configured to cause the robot to emulate the user's mood and interactions. Thus, complex tasks, such as programming a robot to greet people at a door, may be achieved by the use of natural actions of a user.

Figure 5:
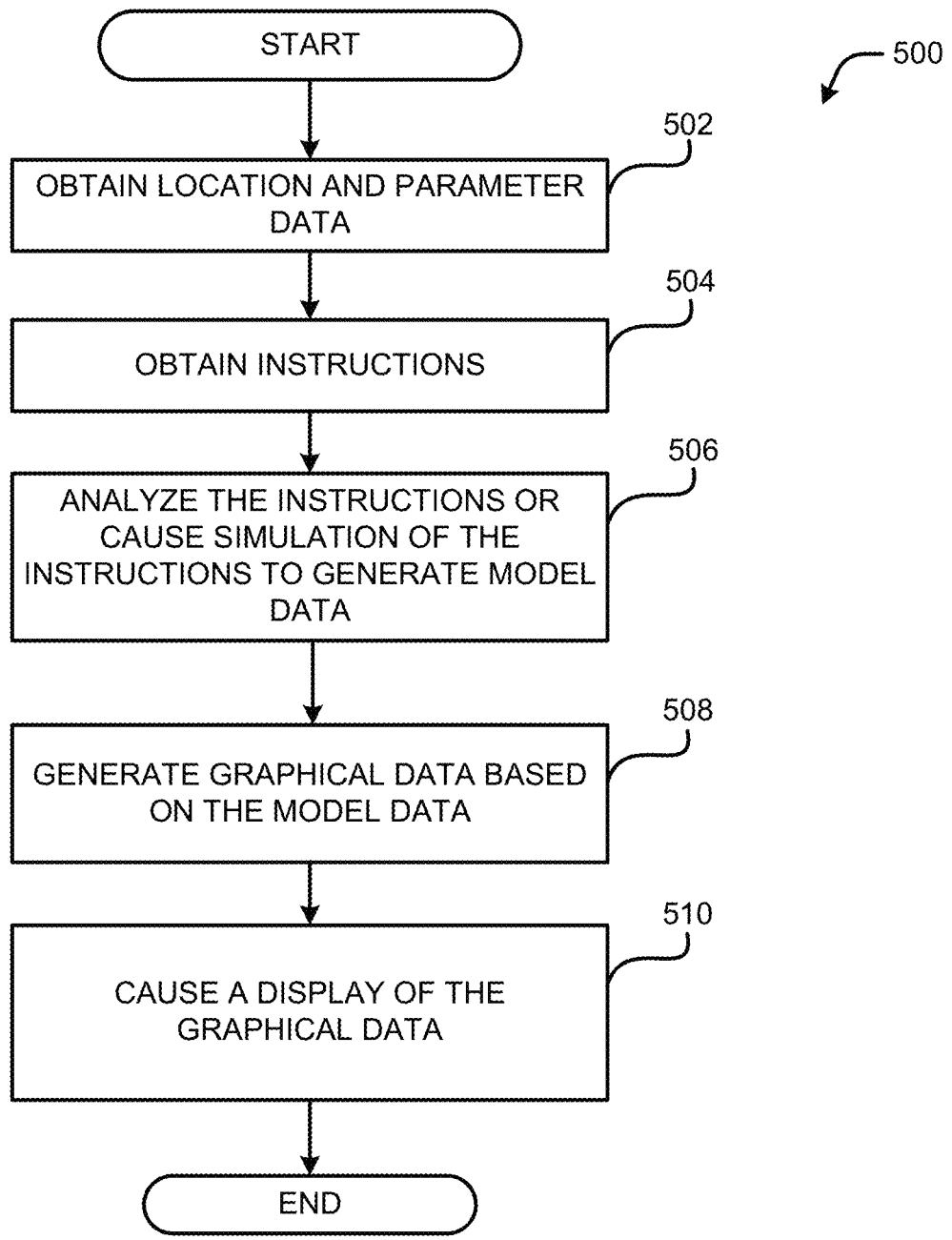
FIG. 5 is flow a diagram illustrating a routine that may be used for providing mixed environment display of robotic actions.

Turning now to FIG. 5, aspects of a routine 500 for providing a context-aware display of objects in mixed environments are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in conjunction with FIG. 1, the operations of the routine 500 are described herein as being implemented, at least in part, by an application, component and/or circuit, such as the program module 111 and/or the server module 107. Although the following illustration refers to the components of FIG. 1, it can be appreciated that the operations of the routine 500 may be also implemented in many other ways. For example, the routine 500 may be implemented, at least in part, by computer processor or processor of another computer. In addition, one or more of the operations of the routine 500 may alternatively or additionally be implemented, at least in part, by a chipset working alone or in conjunction with other software modules. Any service, circuit or application suitable for providing contextual data indicating the position or state of any device may be used in operations described herein.

With reference to FIG. 5, the routine 500 begins at operation 502, where the program module 111 or the server module 107 obtains location information for one or more objects. The location information may identify the location of one or more computing devices, such as a robot, and other objects surrounding the one or more computing devices. The location information may also identify aspects of an environment surrounding the one or more computing devices, such as walls of a room and other obstacles.

In some configurations, the location information may be obtained through an input device of a computer, such as an HMD. Input devices, such as cameras or other sensors, may be used to identify the location of one or more objects. In one example, an HMD worn by a user may have one or more sensors to identify the location of a robot. In addition, the sensors may be used to determine the location of objects surrounding the robot. As summarized above, the robot may be configured with visual identifiers, such as colored lights, which may be detected by the sensors of the HMD. In some configurations, one or more sensors attached to the robot may be used to collect and communicate location information for one or more objects.

Next, at operation 504, the one or more computing devices may obtain instructions. The instructions may be in any format using any type of language suitable for controlling a computing device, such as the robot 102. In addition, the instructions may define one or more tasks for a robot to perform. For example, the instructions may be configured to direct a robot to move through one or more obstacles to interact with various objects in an environment. The instructions may come from any resource, such as a local computer or a remote computer. The instructions may be generated by the techniques disclosed herein.

Next, at operation 506, one or more computing devices may analyze the instructions and/or initiate a simulation of the instructions to generate model data defining the actions or projected actions of a computing device. In a first example, based on the location information of the robot 102 and one or more objects, a simulation may determine a path the robot 102 may follow to avoid obstacles. In addition, a simulation may determine interactions the robot may have with one or more obstacles such as the object 204 depicted in FIG. 3B. A simulation may also be based on other information, such as physical characteristics of the robot and other objects that may interact with the robot. For instance, the size and weight of objects, may determine if the robot is capable of achieving the one or more tasks defined in the instructions. Operation 506 may include the generation of model data defining actions and results of a robot based on the analysis and/or an executed simulation of the instructions. In addition, the model data can also include performance data, such as the speed the robot is able to perform the tasks defined in the instructions.

In another example of operation 506, a robot may execute the instructions to actually perform one or more tasks defined in the instructions. In such an example, the robot may actually perform one or more tasks, and generate model data based on the performance of the robot. In this example, the robot 102 and/or the computing device 110 can observe and record actions performed by the robot 102 to generate model data. The model data can be configured to show a path the robot followed, performance data indicating whether the robot was able to perform one or more tasks, etc. For instance, the model data may indicate whether a robot was actually able to avoid an obstacle, pick up a device, or carry out any other task defined in the instructions. Observations by one or more sensors 153 or input devices 119 of the computing device 110 may be used to determine if a task has been achieved.

Next, at operation 508, one or more computing devices can generate graphical data based on the model data generated by the simulation and/or analysis of the instructions. The graphical data may be in any format and may provide a graphical representation of a task performed by the robot or a simulation of the task defined in the instructions. In some configurations, the graphical data may include an animation illustrating multiple stages of execution. The graphical data can be configured to include a graphical representation of a computing device, such as the robot 102, and/or graphical representations of one or more objects that interact with the computing device. For instance, the graphical data may include one or more illustrations such as the illustrations of FIG. 3B-3E.

Next, at operation 510, one or more computing devices can cause a display of the graphical data on an interface. For example, the graphical data may be displayed on an interface of a computing device, such as an HMD. The display of the graphical data can provide visualizations of a robot's actions in the space where they will occur before they are performed by the robot for improved understanding and safety. Configurations disclosed herein also generate displays from a robot's perspective of the space around it, e.g., the location of surrounding people and objects, for improved understanding and safety. In addition, configurations disclosed herein generate data configured to display a robot's past actions in an environment allowing users or system to confirm an operation and/or to debug one or more operations.

Figure 6:
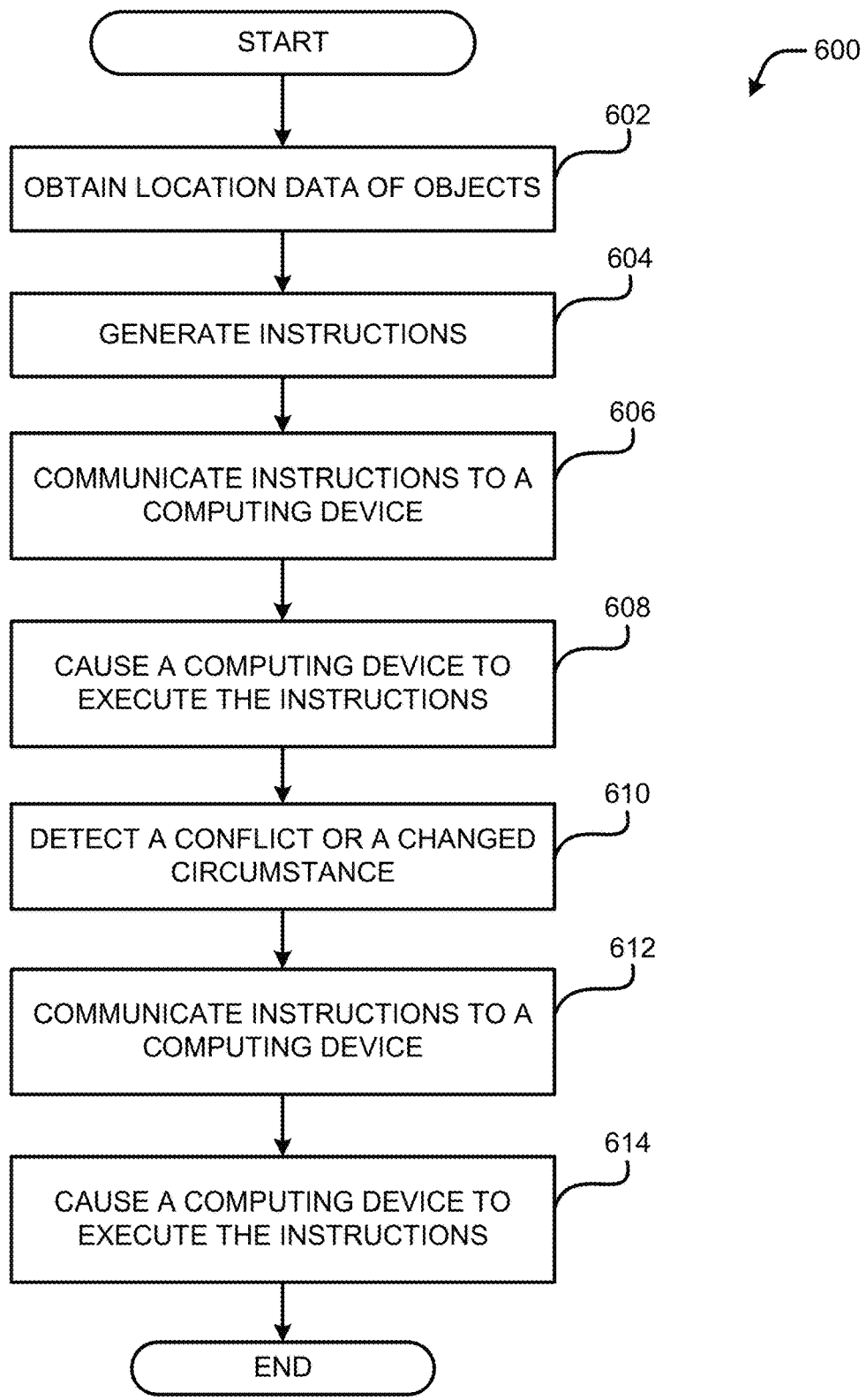
FIG. 6 is flow a diagram illustrating a routine that may be used for providing enhanced configuration and control of robots.

Turning now to FIG. 6, aspects of a routine 600 for providing enhanced configuration and control of robots. The routine 600 begins at operation 602, where one or more computing devices obtain location information for one or more objects. The location information may identify the location of one or more computing devices, such as a robot, and other objects surrounding the one or more computing devices. The location information may also identify aspects of an environment surrounding the one or more computing devices, such as walls of a room and other obstacles.

In some configurations, the location and parameter information may be obtained. As summarized above, information related to one or more objects can be obtained through an input device of a computer, such as an HMD. Input devices such as cameras or other sensors may be used to identify the location of one or more objects. In one example, an HMD worn by a user may have one or more sensors to identify the location of a robot. In addition, the sensors may be used to determine the location of objects in an environment of the robot. In some configurations, the robot may be configured with identifiers, such as colored lights, which may be detected by the sensors of the HMD. In some configurations, one or more sensors attached to the robot may be used to collect and communicate location information for one or more objects.

In one illustrative example, operation 602 and other operations disclosed herein can utilize the first computing device having one or more sensors configured to detect a location and geometric parameters of a second computing device and an environment surrounding the second computing device. In some configurations, for example, the first computing device may be an HMD; and the second computing device may be a mobile robot. The first computing device can have a memory having a first set of computer-executable instructions stored thereupon that can cause the first computing device to receive a signal from the sensors. Based on the signal, the first computing device can generate data identifying the geometric parameters of the environment. In addition, the first computing device can generate location data identifying the location of the second computing device relative to the environment based on the signal.

Next, at operation 604, one or more computing devices can cause the generation of a set of instructions, also referred to herein as "instructions." In some configurations, the set of instructions can be configured for a second computing device, such as a robot 102, to perform one or more tasks. The set of instructions can be based, at least in part, on the location data identifying the location of the second computing device and the data identifying the geometric parameters of the environment. For example, a set of instructions may direct the robot 102 to navigate through obstacles within an environment. In addition, the instructions may cause the robot 102 to interact with one or more objects, which may involve computers or other robots.

Next, at operation 606, the set of instructions configured for the second computing device can be communicated to the second computing device. With reference to FIG. 1, for example, a set of instructions generated by the computing device 110 may be communicated to another computer, such as the robot 102. This example is provided for illustrative purposes and is not to be construed as limiting. It can be appreciated that any one of the computing devices of the system 100 may generate instructions in any format and communicate the generated instructions to any computing device suitable for executing the instructions.

Next, at operation 608, one or more computing devices can cause the execution of the set of instructions. For example, the set of instructions may be executed by the robot 102. The execution of the instructions may cause a computing device, such as the robot 102, to complete one or more tasks. For example, the execution of the instructions may cause the computing device to navigate through obstacles, interact with objects, and perform any task, e.g., action or function, defined in the instructions.

Next, at operation 610, one or more computing devices can detect a conflict or a changed circumstance. For illustrative purposes, a conflict may include an unintended circumstance created by the execution of the set of instructions. For instance, the computing device executing the instructions may run into a boundary of the environment. In another example, if the robot 102 is entering data at another computer, an error in the data entry may be detected. Techniques disclosed herein may also detect a changed circumstance. For instance, if an object moves within the environment during the execution of the instructions, techniques disclosed herein may detect such a movement and determine that a changed circumstance exists.

Next, at operation 612, a device, one or more computing devices can generate a modification to the instructions or generate new instructions to address the conflict or the changed circumstance detected at operation 610. With reference to the above example, where a robot 102 collides with a boundary of the environment, a modification to the instructions or new instructions can be generated to mitigate the detected collision. With respect to the example where an object (205 of FIG. 2B) moves with an environment, a computing device 101, by the use of its sensors, may identify the new location of the moved object. Modifications to the instructions or new instructions can be generated to address the changed circumstance. In such an example, e.g., the instructions generated in operation 612 may cause the robot 102 to identify the new location of the moved object and interact with the new location of the object appropriately. These examples are provided for illustrative purposes and are not to be construed as limiting. The instructions generated in operation 612 may address any changed circumstance, conflict, or situation.

Next, at operation 612, the modification to the instructions or new instructions may be communicated to a computing device for execution. For example, similar to operation 606, instructions or modifications to a set of instructions may be communicated to a computing device, such as the robot 102. Operation 612 can include the communication of new instructions and/or data defining modifications to an instruction set.

Next at operation 614, a computing device can execute the received instructions or instruction modifications. Any number of computing devices may cause the execution of the received instructions. With reference to the above examples, instructions received in operation 614 may cause a computing device, such as the robot 102, to take corrective actions to mitigate a conflict or address a changed circumstance.

It can be appreciated that certain operations of routine 600 may be repeated to allow a first computing device, such as an HMD, and a second computing device, such as a robot, to act in concert such that the first computing device may continually adjust actions taken by the second computing device to address change circumstances and conflicts that may arise during the execution of any instruction set. Any code generated throughout routine 600 may help a mobile computing device avoid collisions, stay within the boundaries of an environment, and accurately interact with various objects by the use of sensors of a computing device that is in communication with the mobile computing device.

Figure 7:
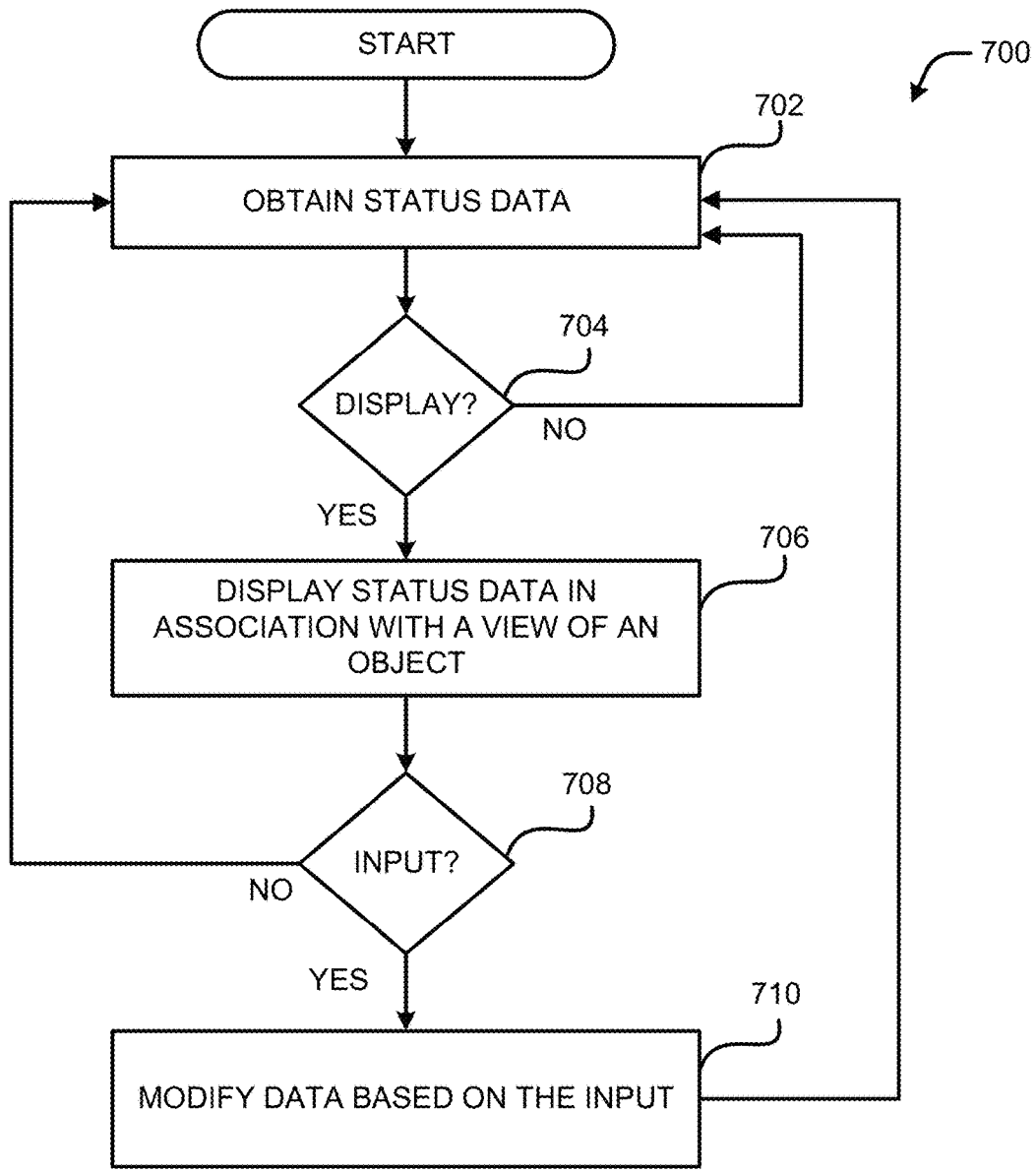
FIG. 7 is flow a diagram illustrating a routine that may be used for providing a mixed environment display of attached data.

Turning now to FIG. 7, aspects of a routine 700 for providing a mixed environment display of attached data. The routine 700 begins at operation 702, where one or more computing devices obtains status data. As summarized above, the status data that may include any information related to any computing device or component. For example, the status data that may relate to a component of the robot 102. The status information may include a measurement of one or more items, such as a temperature, velocity or a direction of movement of a particular component or computing device.

The status data may originate from one or more resources. For example, a camera attached to the computing device 110 may capture image data. The image data may be analyzed to detect a movement of one or more components. Using one or more known techniques, a frame-by-frame analysis can be used to determine the speed and direction of a moving object. In another example, a sensor, such as an infrared sensor may be used. In such configurations, a temperature of a device or component can be measured. In yet another example, status data may be communicated from the robot 102, to one or more computing devices, such as the computing device 110, for further processing and analysis. In operation 702, other types of data may be obtained. For example, the image data may be analyzed to determine geometric parameters of one or more objects, such as the robot 102.

Next, at operation 704, an analysis of obtained data can be performed to determine if the status data is to be displayed. One or more factors can be used to determine if the status data is to be displayed. For example, if the temperature of a device or component reaches a threshold, the system can determine that such data can be displayed. Any other factor, including a user input, one or more settings or a threshold may be used in operation 704 to determine if the status data is to be displayed.

Next, at operation 706, configurations disclosed herein cause a display of the obtained status data. In some configurations, a graphical element describing the status data may be displayed. In an illustrative example, graphical elements such as an arrow, lines, text, or other graphical elements may be used to describe the status data or other information obtained in operation 702. In some configurations, the displayed data is attached to one or more objects viewed on or through an interface. For example, an interface can be configured to provide a real-world view of at least a portion of a computing device, such as the robot 102, through a section of the interface. A graphical element describing a status or other obtained data can be configured to indicate an association between the graphical element and at least the portion of the real-world view of the computing device. Graphical associations between data and one or more displayed objects may help users readily understand the context of the attached data.

Next, at operation 708, one or more computing devices may receive an input. For example, an input from a user, which may include a voice command, a gesture detected by a camera, keyboard, a mouse, or any other type of input, may be used to modify data or a setting of the robot 102. Operation 708, if an input is received, the routine 700 proceeds to operation 710 where one or more computing devices modifies data based on the input. Various settings of the robot 102 or another computing device may be modified based on the input. For example, if at operation 706, displayed status data indicated that the speed of a moving robot 102 is 2 inches per minute, a user input may be received at operation 708 controlling the speed of the robot 102. Other settings and controls can be modified based on an input received at operation 708. After operation 710 or if no input is received at operation 708, the routine 700 may terminate or return to operation 702 where other status data may be received.

Figure 8:
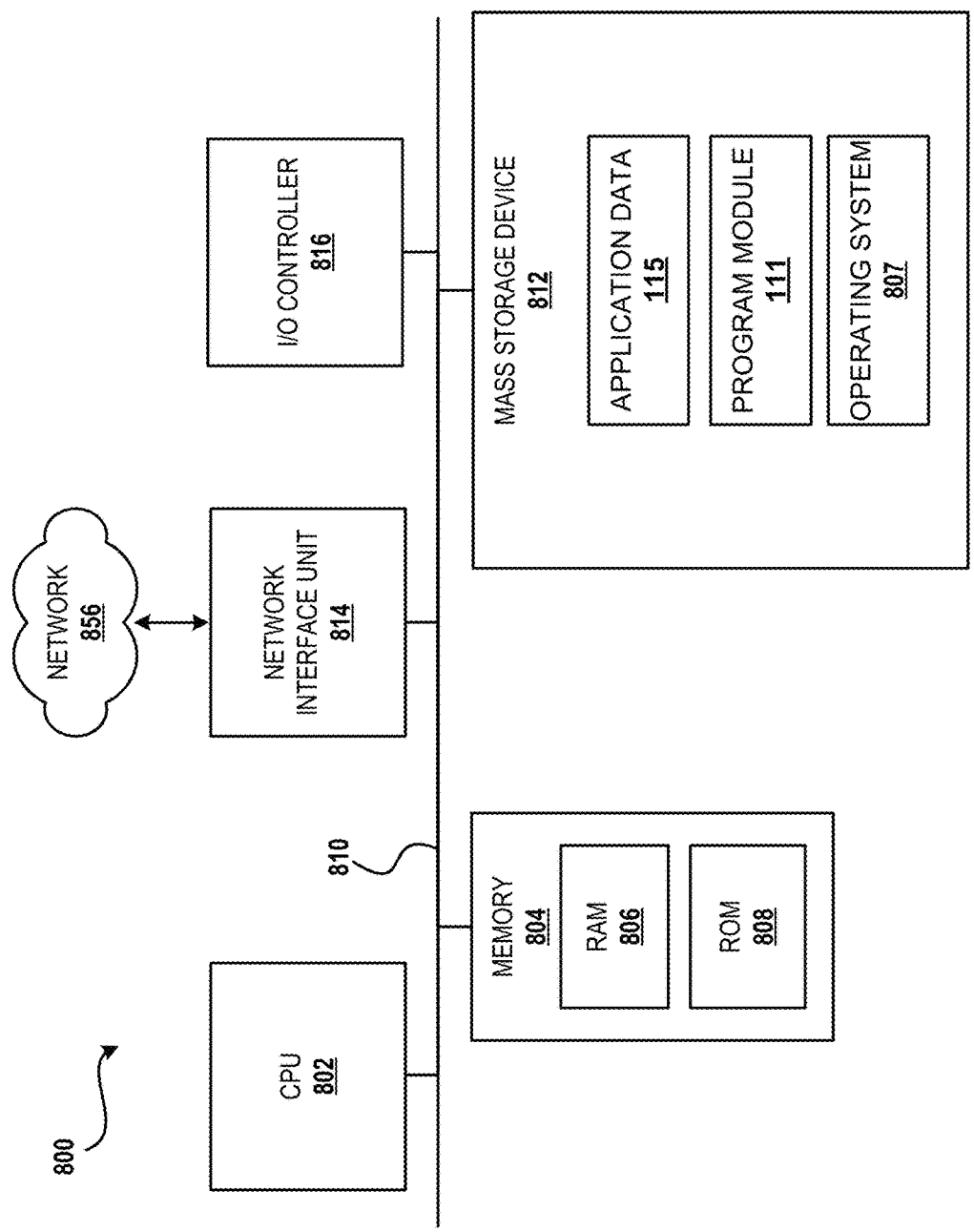
FIG. 8 is a computer architecture diagram illustrating an illustrative computer hardware and software architecture for a computing system capable of implementing aspects of the techniques and technologies presented herein.

FIG. 8 shows additional details of an example computer architecture 800 for a computer, such as the computing device 101 (FIG. 1), capable of executing the program components described above for providing enhanced control of one or more robots. Thus, the computer architecture 800 illustrated in FIG. 8 illustrates an architecture for a server computer, mobile phone, a PDA, a smart phone, a desktop computer, a netbook computer, a tablet computer, and/or a laptop computer. The computer architecture 800 may be utilized to execute any aspects of the software components presented herein.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 807, and one or more application programs including, but not limited to, a tracking module 105 and contextual data 801.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes the claims, the phrase "computer storage medium," "computer-readable storage medium" and variations thereof, does not include waves, signals, and/or other transitory and/or intangible communication media, per se.

According to various configurations, the computer architecture 800 may operate in a networked environment using logical connections to remote computers through the network 856 and/or another network (not shown). The computer architecture 800 may connect to the network 856 through a network interface unit 814 connected to the bus 810. It should be appreciated that the network interface unit 814 also may be utilized to connect to other types of networks and remote computer systems. The computer architecture 800 also may include an input/output controller 816 for receiving and processing input from a number of other devices, including a keyboard, mouse, or electronic stylus (not shown in FIG. 8). Similarly, the input/output controller 816 may provide output to a display screen, a printer, or other type of output device (also not shown in FIG. 8).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Figure 9:
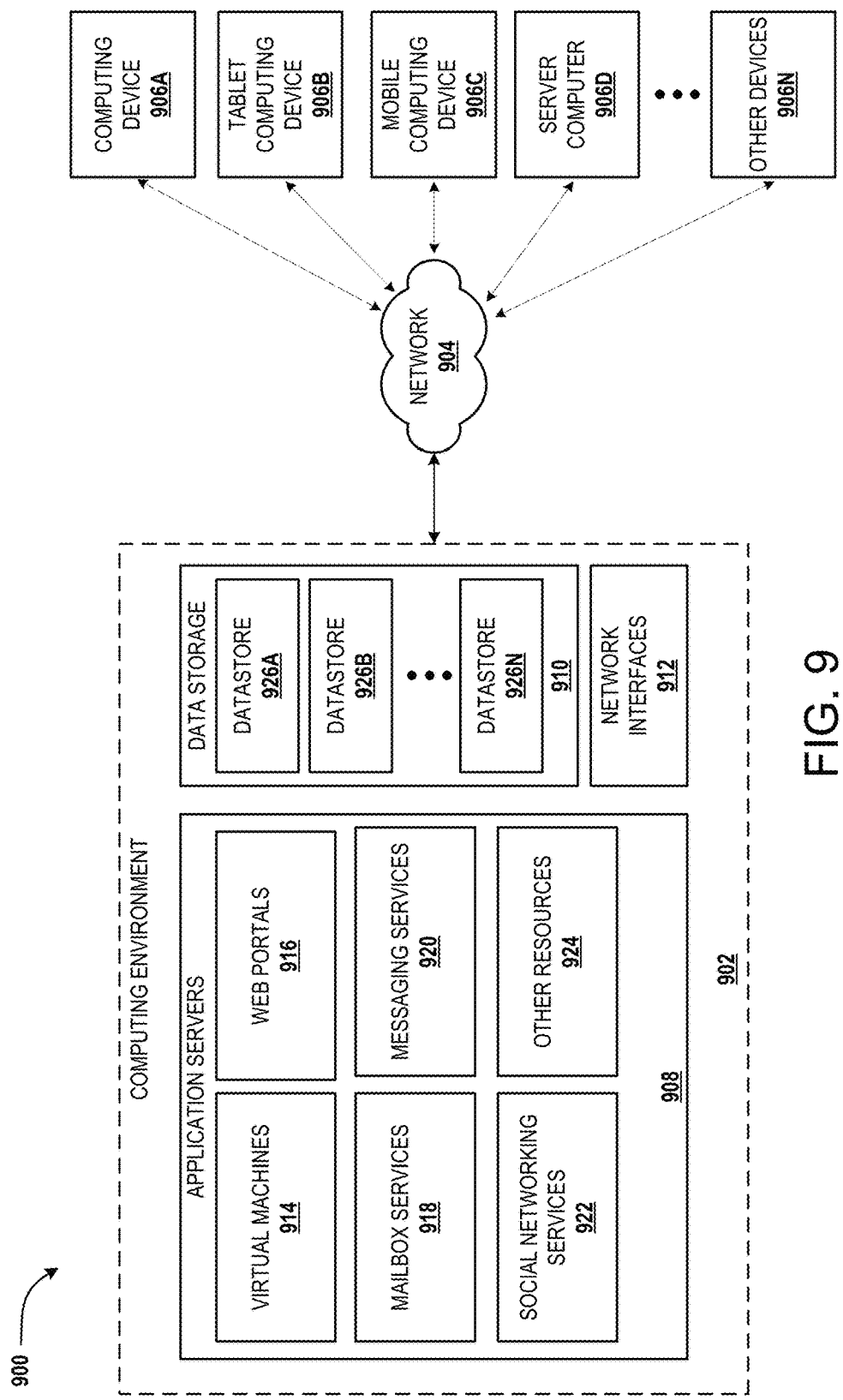
FIG. 9 is a diagram illustrating a distributed computing environment capable of implementing aspects of the techniques and technologies presented herein.

FIG. 9 depicts an illustrative distributed computing environment 900 capable of executing the software components described herein for providing enhanced control of one or more robots, among other aspects. Thus, the distributed computing environment 900 illustrated in FIG. 9 can be utilized to execute any aspects of the software components presented herein. For example, the distributed computing environment 900 can be utilized to execute aspects of the techniques disclosed herein.

According to various implementations, the distributed computing environment 900 includes a computing environment 902 operating on, in communication with, or as part of the network 904. The network 904 may be or may include the network 856, described above with reference to FIG. 5. The network 904 also can include various access networks. One or more client devices 906A-906N (hereinafter referred to collectively and/or generically as "clients 906") can communicate with the computing environment 902 via the network 904 and/or other connections (not illustrated in FIG. 9). In one illustrated configuration, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902. Two example computing architectures for the clients 906 are illustrated and described herein with reference to FIGS. 8 and 10. It should be understood that the illustrated clients 906 and computing architectures illustrated and described herein are illustrative, and should not be construed as being limited in any way.

In the illustrated configuration, the computing environment 902 includes application servers 908, data storage 910, and one or more network interfaces 912. According to various implementations, the functionality of the application servers 908 can be provided by one or more server computers that are executing as part of, or in communication with, the network 904. The application servers 908 can host various services, virtual machines, portals, and/or other resources. In the illustrated configuration, the application servers 908 host one or more virtual machines 914 for hosting applications or other functionality. According to various implementations, the virtual machines 914 host one or more applications and/or software modules for providing enhanced control of one or more robots. It should be understood that this configuration is illustrative, and should not be construed as being limiting in any way. The application servers 908 also host or provide access to one or more portals, link pages, Web sites, and/or other information ("Web portals") 916.

According to various implementations, the application servers 908 also include one or more mailbox services 918 and one or more messaging services 920. The mailbox services 918 can include electronic mail ("email") services. The mailbox services 918 also can include various personal information management ("PIM") services including, but not limited to, calendar services, contact management services, collaboration services, and/or other services. The messaging services 920 can include, but are not limited to, instant messaging services, chat services, forum services, and/or other communication services.

The application servers 908 also may include one or more social networking services 922. The social networking services 922 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 922 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 922 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 922 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 922 are not mentioned herein for the sake of brevity. As such, the above configurations are illustrative, and should not be construed as being limited in any way. According to various implementations, the social networking services 922 may host one or more applications and/or software modules for providing the functionality described herein for providing enhanced control of one or more robots. For instance, any one of the application servers 908 may communicate or facilitate the functionality and features described herein. For instance, a social networking application, mail client, messaging client, a browser running on a phone or any other client 906 may communicate with a networking service 922 and facilitate the functionality, even in part, described above with respect to FIGS. 5-7.

As shown in FIG. 9, the application servers 908 also can host other services, applications, portals, and/or other resources ("other resources") 924. The other resources 924 can include, but are not limited to, document sharing, rendering or any other functionality. It thus can be appreciated that the computing environment 902 can provide integration of the concepts and technologies disclosed herein provided herein with various mailbox, messaging, social networking, and/or other services or resources.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more server computers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the application servers 908 and/or other data. Although not illustrated in FIG. 9, the datastores 926 also can host or store web page documents, word documents, presentation documents, data structures, algorithms for execution by a recommendation engine, and/or other data utilized by any application program or another module, such as the content manager 105. Aspects of the datastores 926 may be associated with a service for storing files.

The computing environment 902 can communicate with, or be accessed by, the network interfaces 912. The network interfaces 912 can include various types of network hardware and software for supporting communications between two or more computing devices including, but not limited to, the clients 906 and the application servers 908. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the clients 906. It should be understood that the clients 906 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 900 to utilize the functionality described herein for providing enhanced control of one or more robots, a mixed environment display of robotic actions and a display of attached data, among other aspects. In one specific example, as summarized above, techniques described herein may be implemented, at least in part, by the operating system 807 of FIG. 8, which works in conjunction with the application servers 908 of FIG. 9.

Figure 10:
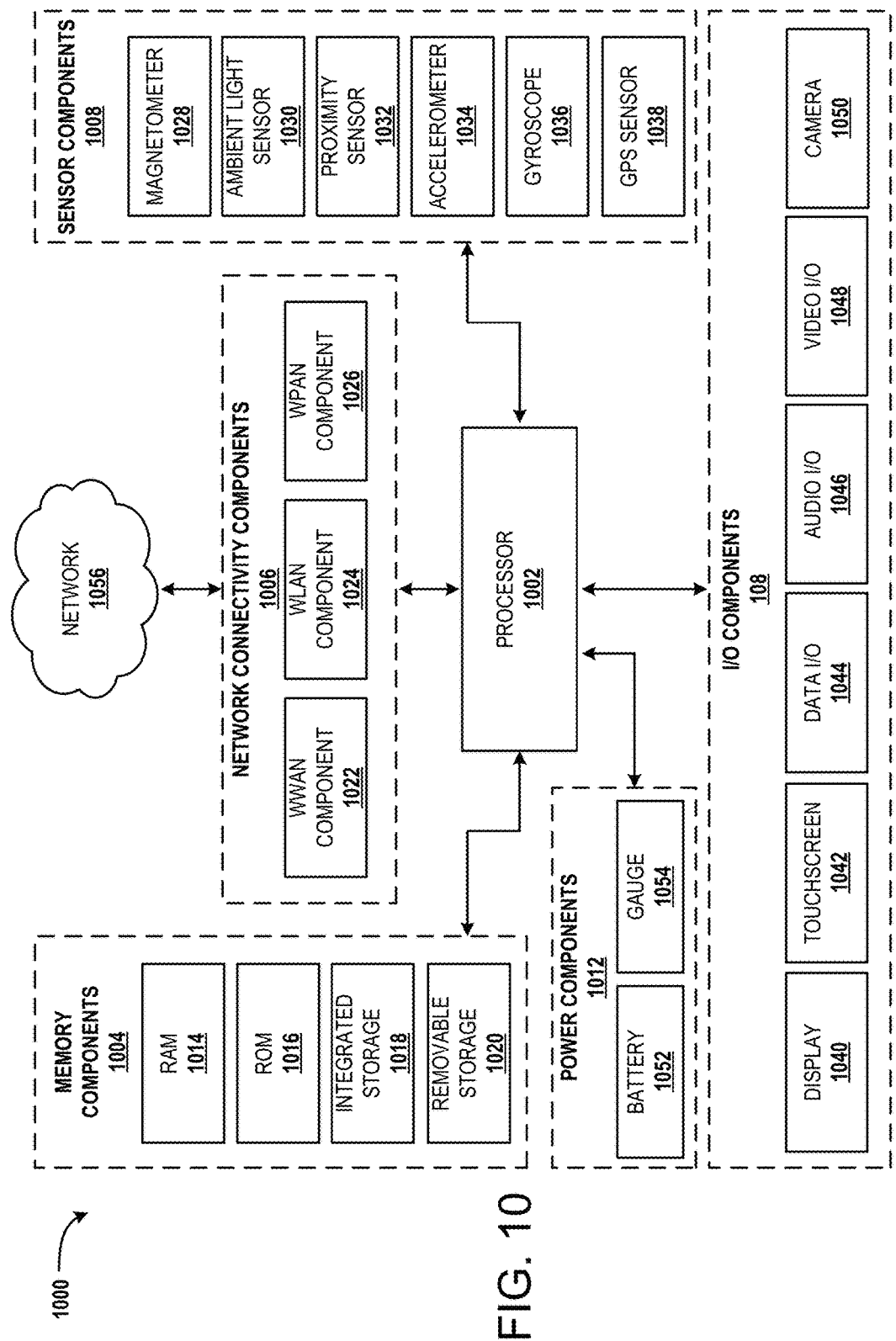
FIG. 10 is a computer architecture diagram illustrating a computing device architecture for a computing device capable of implementing aspects of the techniques and technologies presented herein.

Turning now to FIG. 10, an illustrative computing device architecture 1000 for a computing device that is capable of executing various software components described herein for providing enhanced control of one or more robots, a mixed environment display of robotic actions and a display of attached data. The computing device architecture 1000 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1000 is applicable to any of the clients 806 shown in FIG. 8. Moreover, aspects of the computing device architecture 1000 may be applicable to traditional desktop computers, portable computers (e.g., laptops, notebooks, ultra-portables, and netbooks), server computers, and other computer systems, such as those described herein. For example, the single touch and multi-touch aspects disclosed herein below may be applied to desktop computers that utilize a touchscreen or some other touch-enabled device, such as a touch-enabled track pad or touch-enabled mouse.

The computing device architecture 1000 illustrated in FIG. 10 includes a processor 1002, memory components 1004, network connectivity components 1006, sensor components 1008, input/output components 1010, and power components 1012. In the illustrated configuration, the processor 1002 is in communication with the memory components 1004, the network connectivity components 1006, the sensor components 1008, the input/output ("I/O") components 1010, and the power components 1012. Although no connections are shown between the individuals components illustrated in FIG. 10, the components can interact to carry out device functions. In some configurations, the components are arranged so as to communicate via one or more busses (not shown).

The processor 1002 includes a central processing unit ("CPU") configured to process data, execute computer-executable instructions of one or more application programs, and communicate with other components of the computing device architecture 1000 in order to perform various functionality described herein. The processor 1002 may be utilized to execute aspects of the software components presented herein and, particularly, those that utilize, at least in part, a touch-enabled input.

In some configurations, the processor 1002 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 1002 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 1002 is, or is included in, a system-on-chip ("SoC") along with one or more of the other components described herein below. For example, the SoC may include the processor 1002, a GPU, one or more of the network connectivity components 1006, and one or more of the sensor components 1008. In some configurations, the processor 1002 is fabricated, in part, utilizing a package-on-package ("PoP") integrated circuit packaging technique. The processor 1002 may be a single core or multi-core processor.

The processor 1002 may be created in accordance with an ARM architecture, available for license from ARM HOLDINGS of Cambridge, United Kingdom. Alternatively, the processor 1002 may be created in accordance with an x86 architecture, such as is available from INTEL CORPORATION of Mountain View, Calif. and others. In some configurations, the processor 1002 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1004 include a random access memory ("RAM") 1014, a read-only memory ("ROM") 1016, an integrated storage memory ("integrated storage") 1018, and a removable storage memory ("removable storage") 1020. In some configurations, the RAM 1014 or a portion thereof, the ROM 1016 or a portion thereof, and/or some combination the RAM 1014 and the ROM 1016 is integrated in the processor 1002. In some configurations, the ROM 1016 is configured to store a firmware, an operating system or a portion thereof (e.g., operating system kernel), and/or a bootloader to load an operating system kernel from the integrated storage 1018 and/or the removable storage 1020.

The integrated storage 1018 can include a solid-state memory, a hard disk, or a combination of solid-state memory and a hard disk. The integrated storage 1018 may be soldered or otherwise connected to a logic board upon which the processor 1002 and other components described herein also may be connected. As such, the integrated storage 1018 is integrated in the computing device. The integrated storage 1018 is configured to store an operating system or portions thereof, application programs, data, and other software components described herein.

The removable storage 1020 can include a solid-state memory, a hard disk, or a combination of solid-state memory and a hard disk. In some configurations, the removable storage 1020 is provided in lieu of the integrated storage 1018. In other configurations, the removable storage 1020 is provided as additional optional storage. In some configurations, the removable storage 1020 is logically combined with the integrated storage 1018 such that the total available storage is made available as a total combined storage capacity. In some configurations, the total combined capacity of the integrated storage 1018 and the removable storage 1020 is shown to a user instead of separate storage capacities for the integrated storage 1018 and the removable storage 1020.

The removable storage 1020 is configured to be inserted into a removable storage memory slot (not shown) or other mechanism by which the removable storage 1020 is inserted and secured to facilitate a connection over which the removable storage 1020 can communicate with other components of the computing device, such as the processor 1002. The removable storage 1020 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1004 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1006 include a wireless wide area network component ("WWAN component") 1022, a wireless local area network component ("WLAN component") 1024, and a wireless personal area network component ("WPAN component") 1026. The network connectivity components 1006 facilitate communications to and from the network 856 or another network, which may be a WWAN, a WLAN, or a WPAN. Although only the network 856 is illustrated, the network connectivity components 1006 may facilitate simultaneous communication with multiple networks, including the network 704 of FIG. 7. For example, the network connectivity components 1006 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 1000 via the WWAN component 1022. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 1022 is configured to provide dual-multi-mode connectivity to the network 856. For example, the WWAN component 1022 may be configured to provide connectivity to the network 856, wherein the network 856 provides service via GSM and UMTS technologies, or via some other combination of technologies. Alternatively, multiple WWAN components 1022 may be utilized to perform such functionality, and/or provide additional functionality to support other non-compatible technologies (i.e., incapable of being supported by a single WWAN component). The WWAN component 1022 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1024 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1026 is configured to facilitate communications with other devices, such as peripherals, computers, or other computing devices via the WPAN.

The sensor components 1008 include a magnetometer 1028, an ambient light sensor 1030, a proximity sensor 1032, an accelerometer 1034, a gyroscope 1036, and a Global Positioning System sensor ("GPS sensor") 1038. It is contemplated that other sensors, such as, but not limited to, temperature sensors or shock detection sensors, also may be incorporated in the computing device architecture 1000.

The magnetometer 1028 is configured to measure the strength and direction of a magnetic field. In some configurations the magnetometer 1028 provides measurements to a compass application program stored within one of the memory components 1004 in order to provide a user with accurate directions in a frame of reference including the cardinal directions, north, south, east, and west. Similar measurements may be provided to a navigation application program that includes a compass component. Other uses of measurements obtained by the magnetometer 1028 are contemplated.

The ambient light sensor 1030 is configured to measure ambient light. In some configurations, the ambient light sensor 1030 provides measurements to an application program stored within one the memory components 1004 in order to automatically adjust the brightness of a display (described below) to compensate for low-light and high-light environments. Other uses of measurements obtained by the ambient light sensor 1030 are contemplated.

The proximity sensor 1032 is configured to detect the presence of an object or thing in proximity to the computing device without direct contact. In some configurations, the proximity sensor 1032 detects the presence of a user's body (e.g., the user's face) and provides this information to an application program stored within one of the memory components 1004 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1032 are contemplated.

The accelerometer 1034 is configured to measure proper acceleration. In some configurations, output from the accelerometer 1034 is used by an application program as an input mechanism to control some functionality of the application program. For example, the application program may be a video game in which a character, a portion thereof, or an object is moved or otherwise manipulated in response to input received via the accelerometer 1034. In some configurations, output from the accelerometer 1034 is provided to an application program for use in switching between landscape and portrait modes, calculating coordinate acceleration, or detecting a fall. Other uses of the accelerometer 1034 are contemplated.

The gyroscope 1036 is configured to measure and maintain orientation. In some configurations, output from the gyroscope 1036 is used by an application program as an input mechanism to control some functionality of the application program. For example, the gyroscope 1036 can be used for accurate recognition of movement within a 3D environment of a video game application or some other application. In some configurations, an application program utilizes output from the gyroscope 1036 and the accelerometer 1034 to enhance control of some functionality of the application program. Other uses of the gyroscope 1036 are contemplated.

The GPS sensor 1038 is configured to receive signals from GPS satellites for use in calculating a location. The location calculated by the GPS sensor 1038 may be used by any application program that requires or benefits from location information. For example, the location calculated by the GPS sensor 1038 may be used with a navigation application program to provide directions from the location to a destination or directions from the destination to the location. Moreover, the GPS sensor 1038 may be used to provide location information to an external location-based service, such as E911 service. The GPS sensor 1038 may obtain location information generated via WI-FI, WIMAX, and/or cellular triangulation techniques utilizing one or more of the network connectivity components 1006 to aid the GPS sensor 1038 in obtaining a location fix. The GPS sensor 1038 may also be used in Assisted GPS ("A-GPS") systems.

The I/O components 1010 include a display 1040, a touchscreen 1042, a data I/O interface component ("data I/O") 1044, an audio I/O interface component ("audio I/O") 1046, a video I/O interface component ("video I/O") 1048, and a camera 1050. In some configurations, the display 1040 and the touchscreen 1042 are combined. In some configurations two or more of the data I/O component 1044, the audio I/O component 1046, and the video I/O component 1048 are combined. The I/O components 1010 may include discrete processors configured to support the various interface described below, or may include processing functionality built-in to the processor 1002.

The display 1040 is an output device configured to present information in a visual form. In particular, the display 1040 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1040 is a liquid crystal display ("LCD") utilizing any active or passive matrix technology and any backlighting technology (if used). In some configurations, the display 1040 is an organic light emitting diode ("OLED") display. Other display types are contemplated.

The touchscreen 1042, also referred to herein as a "touch-enabled screen," is an input device configured to detect the presence and location of a touch. The touchscreen 1042 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1042 is incorporated on top of the display 1040 as a transparent layer to enable a user to use one or more touches to interact with objects or other information presented on the display 1040. In other configurations, the touchscreen 1042 is a touch pad incorporated on a surface of the computing device that does not include the display 1040. For example, the computing device may have a touchscreen incorporated on top of the display 1040 and a touch pad on a surface opposite the display 1040.

In some configurations, the touchscreen 1042 is a single-touch touchscreen. In other configurations, the touchscreen 1042 is a multi-touch touchscreen. In some configurations, the touchscreen 1042 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1042. As such, a developer may create gestures that are specific to a particular application program.

In some configurations, the touchscreen 1042 supports a tap gesture in which a user taps the touchscreen 1042 once on an item presented on the display 1040. The tap gesture may be used for various reasons including, but not limited to, opening or launching whatever the user taps. In some configurations, the touchscreen 1042 supports a double tap gesture in which a user taps the touchscreen 1042 twice on an item presented on the display 1040. The double tap gesture may be used for various reasons including, but not limited to, zooming in or zooming out in stages. In some configurations, the touchscreen 1042 supports a tap and hold gesture in which a user taps the touchscreen 1042 and maintains contact for at least a pre-defined time. The tap and hold gesture may be used for various reasons including, but not limited to, opening a context-specific menu.

In some configurations, the touchscreen 1042 supports a pan gesture in which a user places a finger on the touchscreen 1042 and maintains contact with the touchscreen 1042 while moving the finger on the touchscreen 1042. The pan gesture may be used for various reasons including, but not limited to, moving through screens, images, or menus at a controlled rate. Multiple finger pan gestures are also contemplated. In some configurations, the touchscreen 1042 supports a flick gesture in which a user swipes a finger in the direction the user wants the screen to move. The flick gesture may be used for various reasons including, but not limited to, scrolling horizontally or vertically through menus or pages. In some configurations, the touchscreen 1042 supports a pinch and stretch gesture in which a user makes a pinching motion with two fingers (e.g., thumb and forefinger) on the touchscreen 1042 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 1042. As such, the above gestures should be understood as being illustrative and should not be construed as being limiting in any way.

The data I/O interface component 1044 is configured to facilitate input of data to the computing device and output of data from the computing device. In some configurations, the data I/O interface component 1044 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1046 is configured to provide audio input and/or output capabilities to the computing device. In some configurations, the audio I/O interface component 1046 includes a microphone configured to collect audio signals. In some configurations, the audio I/O interface component 1046 includes a headphone jack configured to provide connectivity for headphones or other external speakers. In some configurations, the audio I/O interface component 1046 includes a speaker for the output of audio signals. In some configurations, the audio I/O interface component 1046 includes an optical audio cable out.

The video I/O interface component 1048 is configured to provide video input and/or output capabilities to the computing device. In some configurations, the video I/O interface component 1048 includes a video connector configured to receive video as input from another device (e.g., a video media player such as a DVD or BLURAY player) or send video as output to another device (e.g., a monitor, a television, or some other external display). In some configurations, the video I/O interface component 1048 includes a High-Definition Multimedia Interface ("HDMI"), mini-HDMI, micro-HDMI, DisplayPort, or proprietary connector to input/output video content. In some configurations, the video I/O interface component 1048 or portions thereof is combined with the audio I/O interface component 1046 or portions thereof.

The camera 1050 can be configured to capture still images and/or video. The camera 1050 may utilize a charge coupled device ("CCD") or a complementary metal oxide semiconductor ("CMOS") image sensor to capture images. In some configurations, the camera 1050 includes a flash to aid in taking pictures in low-light environments. Settings for the camera 1050 may be implemented as hardware or software buttons.

Although not illustrated, one or more hardware buttons may also be included in the computing device architecture 1000. The hardware buttons may be used for controlling some operational aspect of the computing device. The hardware buttons may be dedicated buttons or multi-use buttons. The hardware buttons may be mechanical or sensor-based.

The illustrated power components 1012 include one or more batteries 1052, which can be connected to a battery gauge 1054. The batteries 1052 may be rechargeable or disposable. Rechargeable battery types include, but are not limited to, lithium polymer, lithium ion, nickel cadmium, and nickel metal hydride. Each of the batteries 1052 may be made of one or more cells.

The battery gauge 1054 can be configured to measure battery parameters such as current, voltage, and temperature. In some configurations, the battery gauge 1054 is configured to measure the effect of a battery's discharge rate, temperature, age and other factors to predict remaining life within a certain percentage of error. In some configurations, the battery gauge 1054 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1012 may also include a power connector, which may be combined with one or more of the aforementioned I/O components 1010. The power components 1012 may interface with an external power system or charging equipment via an I/O component.

Based on the foregoing, it should be appreciated that concepts and technologies have been disclosed herein that provide, among other techniques, enhanced control of one or more robots. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A computer-implemented method, comprising:
    receiving one or more signals from one or more sensors attached to a head-mounted device;
    determining, based at least in part on the one or more signals, a location of a computing device relative to one or more locations of one or more objects;
    generating, based at least in part on the one or more signals, data identifying geometric parameters of the one or more objects;
    generating a set of instructions for the computing device to perform one or more tasks based at least in part on the data identifying the geometric parameters of the one or more objects;
    communicating the set of instructions to the computing device thereby causing the computing device to perform the one or more tasks;
    determining, at the head-mounted device, that a movement of the computing device conflicts, or is on course to conflict, with at least one object of the one or more objects;
    generating a modification to the set of instructions to mitigate a conflict caused by the movement of the computing device; and
    communicating the modification to the set of instructions to the computing device thereby causing the computing device to move based at least in part on the modification to the set of instructions.

2. The computer-implemented method of claim 1, wherein the data identifying the geometric parameters of the one or more objects defines at least one of a shape or a size of individual ones of the one or more objects.

3. The computer-implemented method of claim 1, further comprising:
    generating data identifying geometric parameters of one or more boundaries of an environment in which the computing device is located; and
    determining, at the head-mounted device, that the movement of the computing device conflicts, or is on course to conflict, with at least one boundary of the one or more boundaries of the environment.

4. The computer-implemented method of claim 3, wherein the conflict comprises a collision with the at least one boundary.

5. The computer-implemented method of claim 1, wherein the conflict is determined based at least in part on an analysis of the one or more signals received from the one or more sensors attached to the head-mounted device.

6. The computer-implemented method of claim 1, wherein the conflict comprises a collision with the at least one object.

7. The computer-implemented method of claim 1, wherein the set of instructions define a path for the computing device to navigate within an environment in which the head-mounted device and the computing device are located.

8. The computer-implemented method of claim 1, wherein the set of instructions define an interaction with at least one other object of the one or more objects.

9. A head-mounted device comprising:
    one or more processors;
    one or more sensors to detect one or more signals; and
    a memory having computer-executable instructions stored thereupon which, when executed by the one or more processors, cause the head-mounted device to:
        determine, based at least in part on the one or more signals, a location of a computing device relative to one or more locations of one or more objects;
        generate, based at least in part on the one or more signals, data identifying geometric parameters of the one or more objects;
        generate a set of instructions for the computing device to perform one or more tasks based at least in part on the data identifying the geometric parameters of the one or more objects;
        communicate the set of instructions to the computing device thereby causing the computing device to perform the one or more tasks;
        determine that a movement of the computing device conflicts, or is on course to conflict, with at least one object of the one or more objects;
        generate a modification to the set of instructions to mitigate a conflict caused by the movement of the computing device; and
        communicate the modification to the set of instructions to the computing device thereby causing the computing device to move based at least in part on the modification to the set of instructions.

10. The head-mounted device of claim 9, wherein the data identifying the geometric parameters of the one or more objects defines at least one of a shape or a size of individual ones of the one or more objects.

11. The head-mounted device of claim 9, wherein the computer-executable instructions further causing the head-mounted device to:
   generate data identifying geometric parameters of one or more boundaries of an environment in which the computing device is located; and
   determine that the movement of the computing device conflicts, or is on course to conflict, with at least one boundary of the one or more boundaries of the environment.

12. The head-mounted device of claim 11, wherein the conflict comprises a collision with the at least one boundary.

13. The head-mounted device of claim 9, wherein the conflict is determined based at least in part on an analysis of the one or more signals, the conflict comprising a collision with the at least one object.

14. The head-mounted device of claim 9, wherein the set of instructions define a path for the computing device to navigate within an environment in which the head-mounted device and the computing device are located.

15. The head-mounted device of claim 9, wherein the set of instructions define an interaction with at least one other object of the one or more objects.

16. A computer storage medium having computer-executable instructions stored thereupon which, when executed by a head-mounted device, cause the head-mounted device to:
   receive one or more signals from one or more sensors;
   determine, based at least in part on the one or more signals, a location of a computing device relative to one or more locations of one or more objects;
   generate, based at least in part on the one or more signals, data identifying geometric parameters of the one or more objects;
   generate a set of instructions for the computing device to perform one or more tasks based at least in part on the data identifying the geometric parameters of the one or more objects;
   communicate the set of instructions to the computing device thereby causing the computing device to perform the one or more tasks;
   determine that a movement of the computing device conflicts, or is on course to conflict, with at least one object of the one or more objects;
   generate a modification to the set of instructions to mitigate a conflict caused by the movement of the computing device; and
   communicate the modification to the set of instructions to the computing device thereby causing the computing device to move based at least in part on the modification to the set of instructions.

* * * * *